United States Patent [19]

Goldsmith et al.

[11] Patent Number: 5,367,673
[45] Date of Patent: Nov. 22, 1994

[54] SYSTEM FOR QUEUEING REQUEST FROM REMOTE STATIONS FOR PROOF PROCESSING OF FILES THAT ARE TRANSMITTED ONLY WHEN PROCESSING RESOURCES BECOME AVAILABLE

[75] Inventors: Chris W. Goldsmith, East Rochester; Scott L. Auer, Webster; William F. Guy; Louis S. Horvath, both of Rochester, all of N.Y.

[73] Assignee: Eastman Kodak Company, Rochester, N.Y.

[21] Appl. No.: 749,024

[22] Filed: Aug. 23, 1991

[51] Int. Cl.$^5$ .................. G06F 15/40; G06F 13/00
[52] U.S. Cl. ..................... 395/600; 364/DIG. 1; 364/229; 364/229.4; 364/230; 364/235; 364/239; 364/282.1; 364/282.4; 364/284; 395/650; 395/800
[58] Field of Search .................. 395/600, 650, 800

[56] References Cited

U.S. PATENT DOCUMENTS

| | | | |
|---|---|---|---|
| 4,503,499 | 3/1985 | Mason et al. | 364/200 |
| 4,708,459 | 11/1987 | Cowan et al. | 355/4 |
| 4,757,525 | 7/1988 | Matthews et al. | 379/89 |
| 4,974,254 | 11/1990 | Perine et al. | 379/100 |
| 5,051,891 | 9/1991 | MacPhail | 395/600 |
| 5,155,761 | 10/1992 | Hammond | 379/67 |

*Primary Examiner*—Thomas C. Lee
*Assistant Examiner*—Wayne Amsbury
*Attorney, Agent, or Firm*—Dennis R. Arndt

[57] ABSTRACT

A queue based technique for handling proof requests in a direct digital color proofing (DDCP) system in a manner which substantially increases the throughput of proof images provided by the system while reducing needed operator interaction with the system. Specifically, proof requests are constructed to contain only parameter values that are necessary for the DDCP system to generate each proof and filename(s) of the accompanying image data therefor, but not the image data itself. These requests are queued in a proof request queue within a raster image processor (RIP) in the DDCP system and sequentially processed thereby on generally a first-in first-out basis. By restricting the requests to parameter values and an accompanying filename(s), a substantial number of these requests can be queued and sequentially processed by the RIP and printed by a proofing engine in the DDCP system without substantial operator intervention. Through an edit facility, a DDCP operator can manipulate the queue to re-prioritize proof requests, change the order through which proof requests will be processed, and add or delete requests as well as change individual parameter values in each proof request, as desired, in order to appropriately change the conditions under which that proof image therefor will be generated. Furthermore, by simultaneously reading and writing image data for two successive proof images to and from two hard files that collectively function on a "ping-pong" basis, pipelined operation occurs which advantageously increases the throughput of proof images for the DDCP system.

49 Claims, 11 Drawing Sheets

FIG. 2A

| | | |
|---:|:---|:---|
| POINTER TO NEXT ENTRY | POINTER TO PRQE | — 205 |
| IMAGE FILE DESCRIPTION | DATA STRUCTURE | — 210 |
| OUTPUT COLOR ORDER | STRING | — 225 |
| SCREEN RULING | FLOAT | — 230 |
| DOT FONT | BYTE | — 235 |
| DESCRIPTION | STRING | — 240 |
| NUMBER OF COPIES | BYTE | — 245 |
| UPPER LEFT HAND CORNER X | INTEGER | — 250 |
| UPPER LEFT HAND CORNER Y | INTEGER | — 255 |
| SCATTER PROOF ENABLE | BOOLEAN | — 260 |
| PRIORITY | BYTE | — 265 |
| EXTRA SEPARATION NAMES [2] | STRING | — 270 |
| RECIPE COLOR NUMBER [2] | STRING | — 275 |
| PASS PARAMETERS [5] | DATA STRUCTURE | — 280 |

PROOF REQUEST 200

FIG. 2B

IMAGE FILE DESCRIPTION

| | | |
|---:|:---|:---|
| CEPS DEVICE NAME | STRING | — 211 |
| JOB NAME | STRING | — 212 |
| PAGE NAME | STRING | — 213 |
| IMAGE NAME | STRING | — 214 |
| CT RESOLUTION | INTEGER | — 215 |
| LW RESOLUTION | INTEGER | — 216 |
| IMAGE HEIGHT | INTEGER | — 217 |
| IMAGE WIDTH | INTEGER | — 218 |
| IMAGE PROCESSING FLAGS | BYTE | — 219 |

IMAGE PROCESSING FLAGS | BYTE | — 219

FLAGS TO ENABLE/DISABLE: SCALE TO FIT
ROTATE IMAGE
MIRROR IMAGE
CONTROL STRIP ENABLE
DATA LEGEND ENABLE

PASS PARAMETERS

| | | |
|---:|:---|:---|
| SCREEN ANGLE | FLOAT | |
| DOT GAIN TABLE | STRING | — 283 |
| SOLID AREA DENSITY | SIGNED BYTE | — 285 |

280

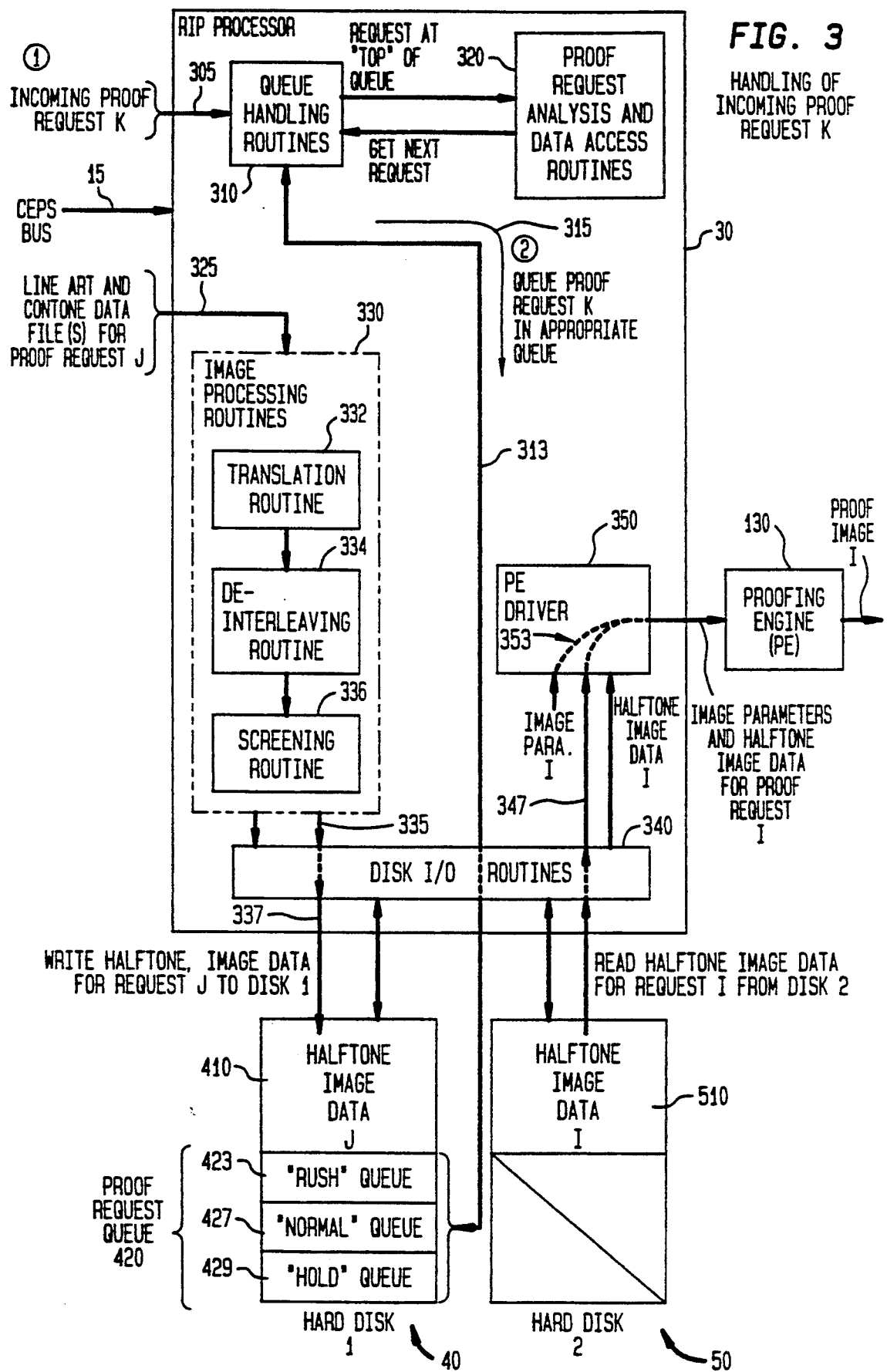

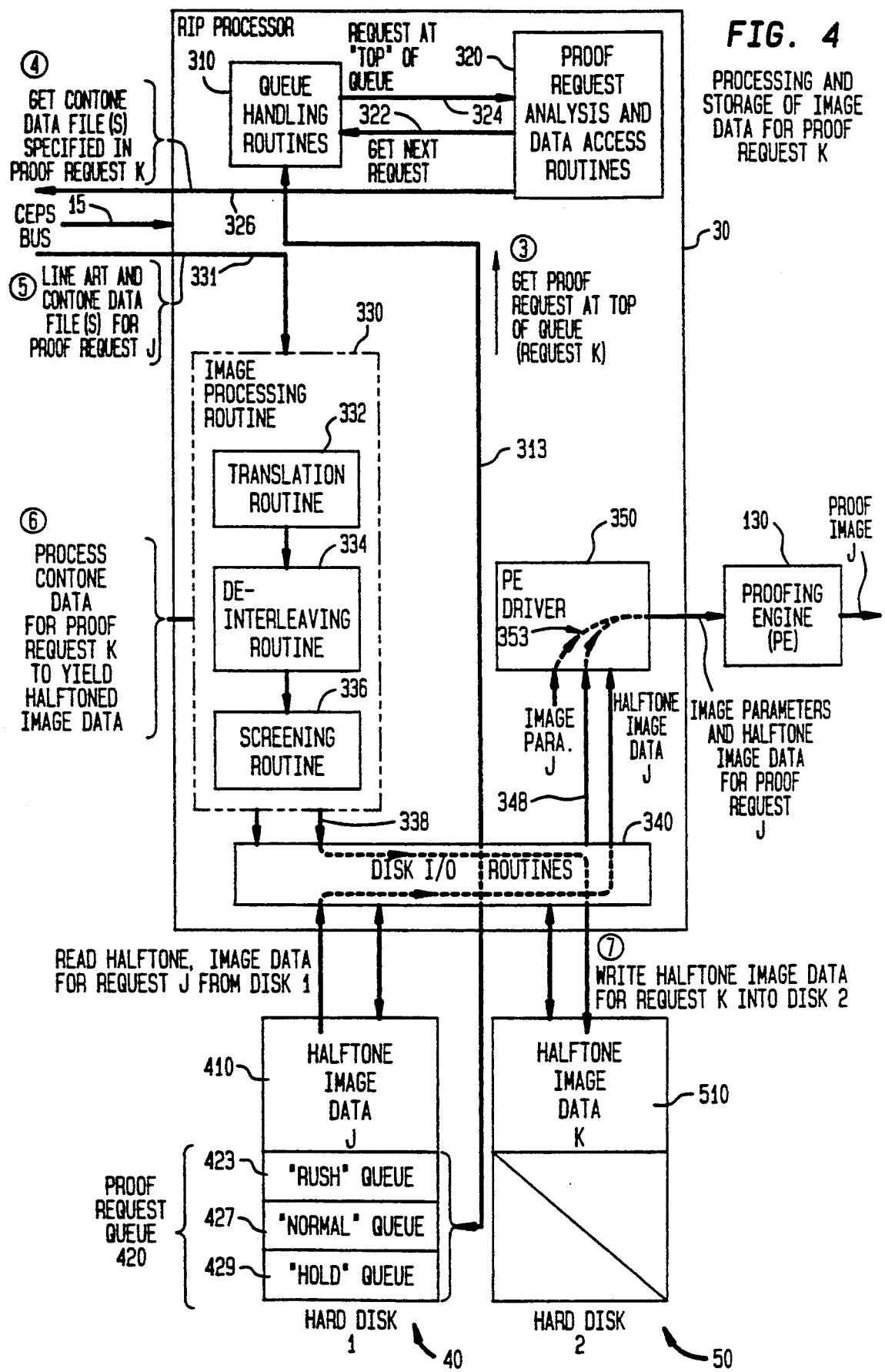

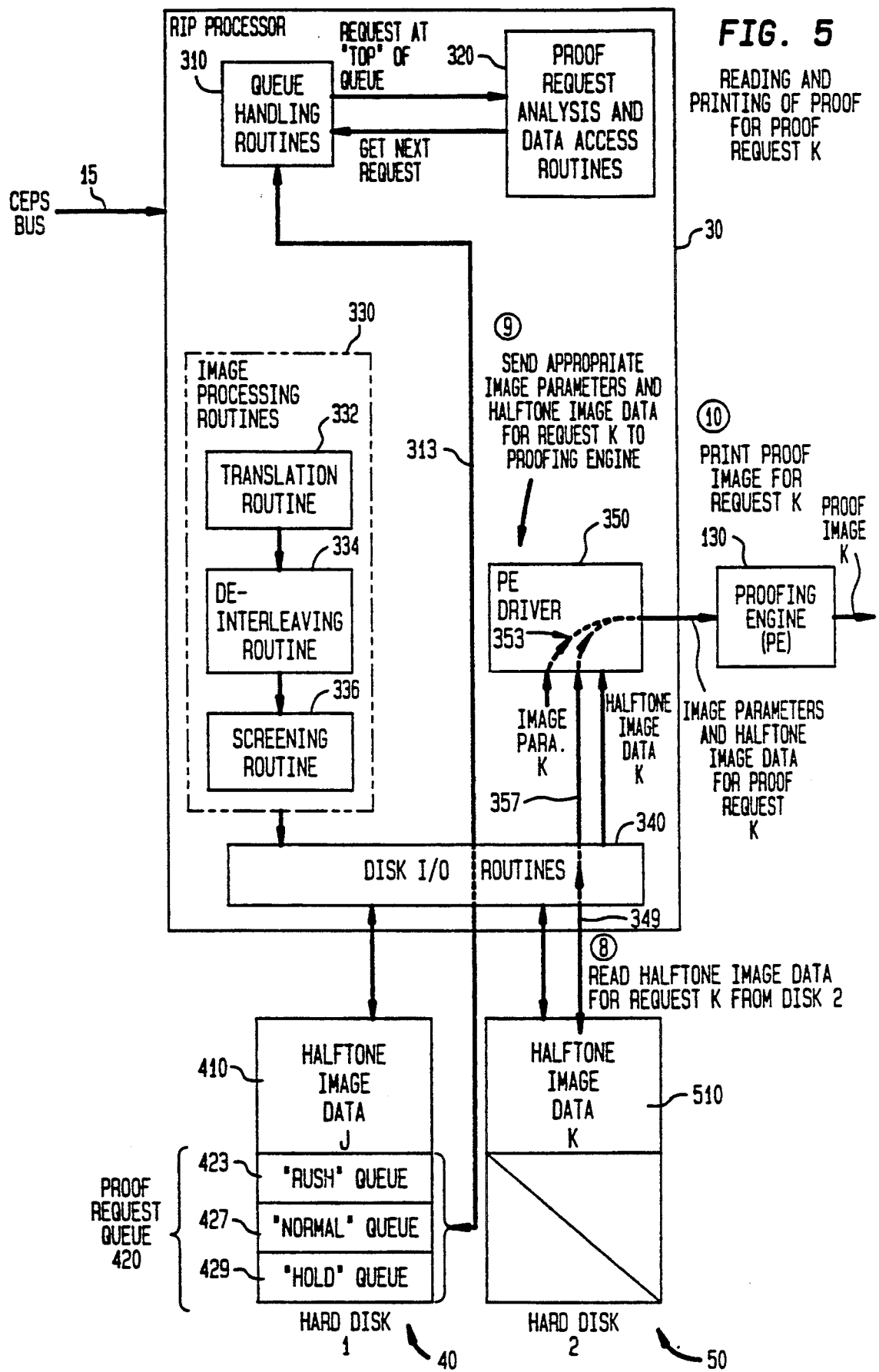

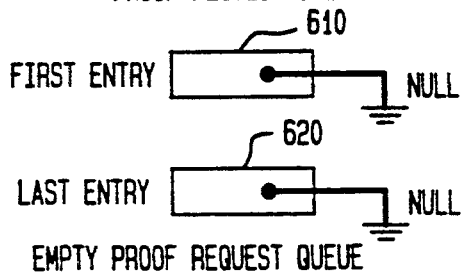
FIG. 6
PROOF REQUEST QUEUE
EMPTY PROOF REQUEST QUEUE
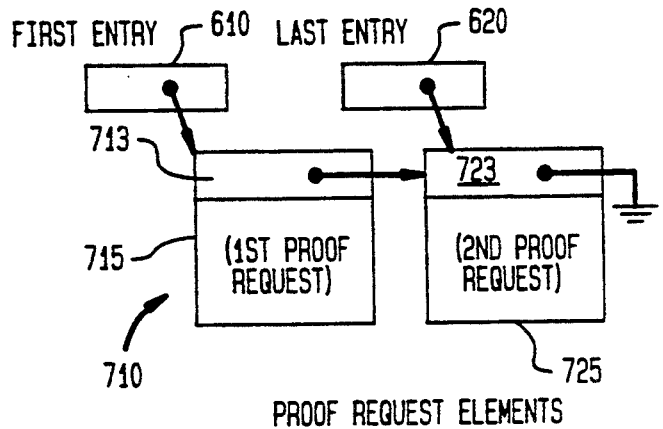
FIG. 7B
PROOF REQUEST QUEUE
INITIALLY NON-EMPTY
FIG. 7A
PROOF REQUEST QUEUE
INITIALLY EMPTY
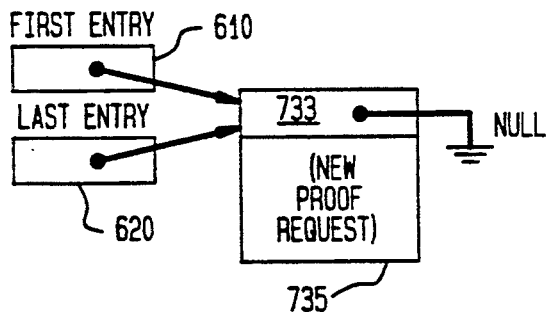
FIG. 7C
PROOF REQUEST QUEUE AFTER ADDITION OF
NEW REQUEST TO END OF QUEUE
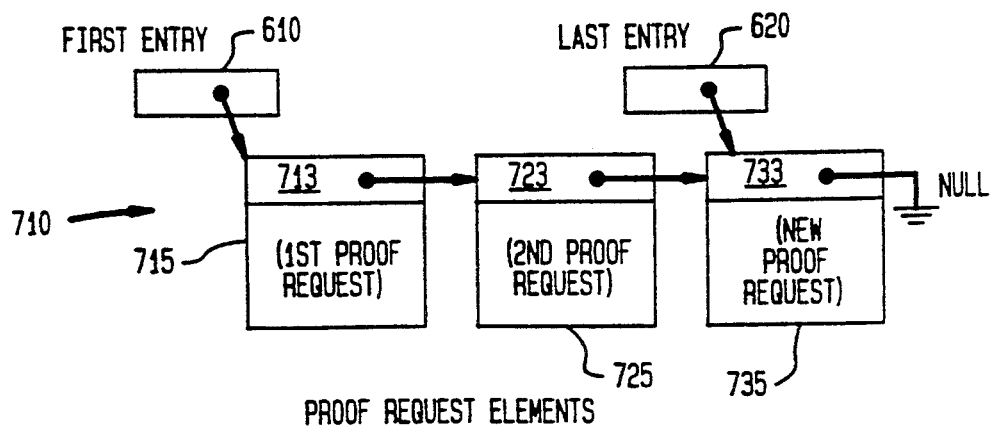
FIG. 7D
PROOF REQUEST QUEUE
AFTER NEW REQUEST
ADDED TO END OF QUEUE

INDIVIDUAL QUEUES IN PROOF REQUEST QUEUE 420

FIG. 10

PROOF REQUEST
SET-UP SCREEN
— 1000

| Approval Proof Setup | | | Proof #2 |
|---|---|---|---|

Device: D0          Job: Job 1        Page: Page 1
(Type) Name:    CT1
Format:         STANDARD
Layout:         ~Scatter          Name: CT1.scat
Expose Offset (h,w): 10.00        0.00 mm
Priority:       ~Normal           Number of copies: 2
                                  Mirror Width: ~No
Separations:    CMYB 3 66         (C, M, Y, B, 1, 2)
Description:    _____
Media Color 1: 3  Lm22     File Name: CT1.03    Separation: C
Media Color 2: 66 BeB      File Name: CT1.66    Separation: Y
First Recipt:  Khaki       File Name: CT1.01    Separation: C
Second Recipe: Pnk45       File Name: CT1.02    Separation: Y

*function keys:*

| Proof | | | | | Prev | Next | Quit |
|---|---|---|---|---|---|---|---|

FIG. 11

PROOF REQUEST QUEUE SCREEN

1100

Kodak Proof Request Queue

PE Status: Proofer is On-Line

| | Station Name | Request ID | Qty | Type | Priority | |
|---|---|---|---|---|---|---|
| | Assembler2 | CTA12009 | 1 | CT | In Expose | |
| | Prisma4 | GGL010 | 1 | LW | In Preparation | |
| 1 | Prisma4 | ABCD023 | 1 | LW | Rush | 1 |
| 2 | Assembler1 | AAAA025 | 1 | LW+2CT | Rush | 2 |
| 3 | Prisma4 | CC026 | 1 | LW+CT | Rush | 3 |
| 4 | Local | Scatter027 | 1 | LW+CT | Normal | 1 |
| 5 | Fyrox1 | qwerty021 | 1 | SCATTER | Normal | 2 |
| 6 | Assembler3 | asd017 | 2 | FLYT | Normal | 3 |
| 7 | Assembler1 | draw016 | 2 | LW+CT | Normal | 4 |
| 8 | Prisma3 | DFD006 | 1 | CT | Hold | 1 |
| 9 * | Assembler2 | MON005 | 1 | LW | Hold | 2 |
| 10 | Prisma4 | FLYT020 | 1 | LW+CT | Hold | 3 |
| 11 | Prisma4 | CC011 | 1 | CT | Hold | 4 | function keys:

| Exit | Change Priority | Delete Entry | Edit Entry | | Scatter Proof | Prev | Next | |

FIG. 12

SCATTER PROOF SET-UP SCREEN

1200

```
┌─Scatter Proof──────── Image Area Size (H x W): 314 x 489 mm─────┐
│     Scatter Name: SCAT1   Priority: ~Normal No. of Copies: 1     │
│                                                                   │
│        Request ID   Size (HxW)      TopL (H, W)      BottomR (H, W) │
│    1   MON005       100.00  100.00   0.00    0.00    100.00  100.00 │
│    2   FLYT020      200.00  200.00   120.00  0.00    320.00  200.00 │
│    3   ADR003       100.00  100.00   0.00    110.00  100.00  210.00 │
│    4   FLW018       50.00   50.00    0.00    220.00  50.00   270.00 │
│    5   MEL025       36.00   36.00    60.00   220.00  96.00   256.00 │
│    6   FL4T029      80.00   50.00    120.00  210.00  200.00  260.00 │
│    7   ADR006       100.00  100.00   0.00    300.00  100.00  400.00 │
│    8   FLSS048      20.00   20.00    120.00  300.00  140.00  320.00 │
│   ──── Choose List ────(Select from these requests on hold)────── │
│    1   DFD006       100.00  100.00                                │
│    2 * MON005       100.00  100.00                                │
│    3 * FLYT020      200.00  200.00                                │
│    4   GNG0027      134.23  120.00                                │
│    5   SRFF0027     114.00  140.00                                │
│                                                                   │
│  (message area)                                                   │
└───────────────────────────────────────────────────────────────────┘
``` function keys:

| Select | Un-Select | | | Exit List | Prev | Next | Quit |

SYSTEM FOR QUEUEING REQUEST FROM REMOTE STATIONS FOR PROOF PROCESSING OF FILES THAT ARE TRANSMITTED ONLY WHEN PROCESSING RESOURCES BECOME AVAILABLE

TECHNICAL FIELD OF THE INVENTION

The invention relates to a direct digital color proofing system and specifically to a queue based technique for handling proof requests, that occur in such a system, in a manner which substantially increases the throughput of proof images provided by the system while reducing needed operator interaction with the system.

BACKGROUND ART

Graphic arts applications frequently require the accurate reproduction of a high resolution color image (commonly referred to as an "artwork"), such as a color photograph, a color drawing, a color layout and the like. A typical application might involve printing a high resolution color image or a series of such images on a page of a periodical, such as a magazine, or a corporate annual report.

Images are oftentimes generated either photographically, on suitable film, or electronically, on video tape or other suitable electronic media. When generated, images share a basic characteristic: they are recorded on a continuous tone (hereinafter referred to as "contone") basis. As such, the color existing at any point in the image is represented by a continuous amplitude value.

Color reproduction equipment takes advantage of the principle that the vast majority of colors can be separated into a specific linear combination of four primary subtractive colors (cyan, yellow, magenta and black—C, Y, M and B) in which the amount of each primary color is set to a predetermined amount. In the case of printed reproductions of an image, use of primary color printing obviates the need to use a differently colored ink for each different color in the image. As such, each image is converted into a succession of three or four color separations, in which each separation is essentially a negative (or positive) transparency with an altered tone reproducing characteristic that carries the color information for only one of the primary colors.

Unfortunately, modern printing presses do not possess the capability of applying differential amounts of ink to any location in an image being printed. Rather, these presses are only designed to either apply or not apply a single amount of ink to any given location on a page. Therefore, a printing press is unable to directly print a contone separation. To successfully circumvent this problem, halftone separations are used instead. An image formed from any single color halftone separation encodes the density information inherent in a color image from amplitude modulated form into a spatial (area) modulated form, in terms of dot size, which is subsequently integrated by the human eye into a desired color. By smoothly changing dot sizes (areas), smooth corresponding tonal variations will be generated in the reproduced image. Given this, the art has taught for some time that a full color image can be formed by properly overlaying single color halftone reproductions for all of the primary subtractive colors, where each reproduction is formed from a halftone dot separation that contains dots of appropriate sizes and in one of these primary colors. Clearly, as size of the dots decreases, an increasing amount of detail can be encoded in a dot pattern and hence in the reproduced image. For that reason, in graphic arts applications, a halftone separation utilizes very small dots to yield a relatively high dot pitch (resolution).

With this in mind, one might first think that printing a color image for graphic arts use should be a fairly simple process. Specifically, a color image could first be converted into corresponding continuous tone separations. Each of these contone separations could then be converted into a corresponding halftone separation. A printing plate could then be manufactured from each halftone separation and subsequently mounted to a printing press. Thereafter, paper or other similar media could be run through the press in such a fashion so as to produce properly registered superimposed halftone images for all the subtractive primary colors thereby generating a full color reproduction of the original image.

Unfortunately, in practice, accurately printing a color image is oftentimes a very tedious, problematic and time consuming manual process that requires a substantial level of skill. First, the conventional manual photographic process of converting a contone separation into a halftone separation, this process commonly being referred to as "screening", is a time consuming manual process in and of itself. Second, various phenomena, each of which disadvantageously degrades an image, often occur in a reproduced halftone color image. Moreover, the complete extent to which each of these phenomena is present in the reproduced image is often known only at a rather late point in the printing process thereby necessitating the use of tedious and time consuming iterative trial and error experimentation to adequately eliminate these phenomena.

Specifically, to verify the accuracy of the color printing process and to enable appropriate adjustments to be made at various stages in the printing process in order to correct image defects and improve reproduction accuracy, a test image, frequently referred to as a "proof" is generated from the halftone separations once they are made. After a proof is generated, it is presented as being representative of the reproduced image which will be produced by a printing press in order to determine the accuracy of the printed image. Oftentimes, the proof contains unexpected and unsightly Moire patterns that arose from the interaction of Moire in the image itself with that introduced by use of angled halftone screens that are used to photographically generate the halftone separations. Frequently, these Moire patterns can be rendered invisible by rotation of one or more of the screens to a different screen angle. Unfortunately, the exact change in the screen angle is frequently very hard to discern from the resulting Moire pattern itself and instead must be determined through trial and error experimentation. Unexpected artifacts can also exist in the proof thereby necessitating that various changes must be made to one or more of the separations. As such, this requires that a one or more new halftone separations must be generated or at least changed, a new proof must be produced and then analyzed, with this "proofing" process being iteratively repeated until the objectionable Moire and all objectionable artifacts are eliminated from the proof. Now, once an acceptable proof is made thereby indicating that a printed image based on the separations will likely present a desired depiction of the original artwork, a separate printing plate is then made for each halftone separation. At this point, a full color test print, commonly referred to as a "press sheet" is produced from these plates onto a sheet of actual paper stock that is to be used to carry the reproduced image, with this operation frequently being referred to as a "press run". The press sheet is then examined to discern all imperfections that exist in the image reproduced therein. Owing to unexpected dot gain, existence of any artifacts in the press sheet and tonal variations occurring in the press run between the press sheet and the original artwork, further adjustments in the coloration or screen angle of the separations may need to be made with the entire process, i.e. both the proofing and the press run processes, being repeated until an acceptable press sheet is produced. With experience gained over several years, a skilled color technician can reduce the number of times that this entire process needs to be repeated in order to produce a set of color halftone separations that yields an acceptable press sheet.

As one can now readily appreciate, the iterative manual process of producing an acceptable set of halftone separations, due to the inherent variability of the process, can be very tedious and inordinately time consuming. Unfortunately, in the graphic arts industry, publication deadlines are often extremely tight and afford very little, if any, leeway. Consequently, the available time in a graphic arts production environment allotted to a color technician to generate a set of halftone separations to meet a particular publication deadline, for example, is often insufficient to allow the technician adequate time, due to the trial and error nature of iterative process, to generate that set of separations which produces a very high quality halftone color image. As such, the technician is often constrained by time pressures to produce a set of separations that produces a visually acceptable, though not necessarily a very high quality, image.

In addition, the manual process can be disadvantageously quite expensive. Inasmuch as the manual process, even for a skilled color technician, involves a certain amount of trial and error experimentation, a number of separate proofs is often made with changed or new separations being generated as a result. Each new separation requires another piece of film. Film and associated developing chemicals are expensive. In addition, if an unacceptable press sheet is produced, then additional separations may need to be made along with new printing plates, which further lengthens the process and increases its expense.

In an effort to reduce the time required and expense associated with conventional manual photographic based color reproduction processes, the art has turned away from use of these manual processes in high volume graphic art applications to the use of other technologies, such as electro-photographic techniques. In this regard, U.S. Pat. No. 4,708,459 (issued to C. Cowan et al on Nov. 24, 1987 and assigned to the present assignee hereof) discloses an electro-photographic color proofing system. While this system does produce an excellent quality proof, the throughput of proof images provided by this system, while far in excess of that associated with manual proofing techniques, has nevertheless proven to be somewhat inadequate for use in those segments of the graphic arts industry that routinely experience tight publication deadlines.

Accordingly, in an effort to provide an even greater throughput, so-called direct digital color proofing (DDCP) systems are being envisioned for directly generating a halftone color proof image from digitized contone separations. These systems would manipulate the separations in digital form to electronically generate appropriate halftone separations, including, inter alia, electronic screening and dot gain compensation, and then directly write the proof image using an appropriate marking engine (henceforth referred to as a "proofing engine").

Unfortunately, DDCP systems, as typically envisioned by those skilled in the art, would probably suffer from two drawbacks that could limit both their throughput and ease of use.

First, these DDCP systems would probably produce proof images based upon "spooling" a sequence of electronic proof requests. A proof request in such a system would be expected to contain both appropriate instructions and parameters, for the proofing engine, to generate each separate proof as well as the accompanying halftone image separation data itself. Unfortunately, since the data for each halftone image separation represents a bit-map of the separation at, what is often, a very fine resolution, a substantial amount of memory space, typically on the order of 20 Mbytes, would be required to store each halftone separation. An additional 20 Mbytes may also be required for linework that is to be printed as part of the image. Hence, for a single four color image, the resulting data for all the separations and the linework in a proof request would require upwards of typically 100 Mbytes of storage space. In a spooled environment, each of these proof requests would be entered into a print queue stored on a hard disk from which these requests would be read and serviced by the proofing engine typically on a first-in, first-out (FIFO) basis. As a consequence of allocating 100 Mbytes for each request, a very substantial amount of hard disk space would be required to accommodate this queue. Hence, owing to finite limits on available hard disk space, the queue could only accommodate a relatively small number of proof requests at any one time. Consequently, to operate the DDCP system at its maximum throughput, an operator would need to continually and repetitively enter new proof requests at relatively short intervals as the queue emptied. This, in turn, places a burden on the operator. Furthermore, if these requests were to be transferred from one point to another within the DDCP system, then an appreciable amount of time would be needed just to transfer the large amount of accompanying image data which, in turn, would suppress the throughput of the DDCP system.

Second, the DDCP system itself would need to be properly configured with appropriate parameter values to generate each individual proof, such as for example with proper screen angles and screen rulings for each separation and the proof image resolution and dimensions. As such, one would think that a human operator would be delegated the task of entering the parameters particular to each proof image into the DDCP system to form each proof request. Unfortunately, this task would place a significant burden on the DDCP operator. Furthermore, the reliance on such an operator to manually enter each proof request into the DDCP system may, through inadvertent human error, cause a significant source of proofing errors which, in turn, would force the operator to expend time and system resources to locate each of these errors and re-proof each affected image to generate an acceptable proof image. This, in turn, would also suppress the throughput of acceptable proof images of the DDCP system.

Therefore, a need exists in the art for a technique for inclusion in a direct digital color proofing system that can significantly increase the throughout of such a system while simultaneously reducing the amount of interaction needed between the operator and the system to correctly generate a sequence of proof images.

DISCLOSURE OF THE INVENTION

Accordingly, it is an object of the present invention to provide a technique for inclusion into a direct digital color proofing (DDCP) system which substantially increases the throughput of the system.

Another object is to provide such a technique that reduces the burden on the operator of such a system by decreasing the amount of interaction needed between the operator and the system to correctly generate a sequence of proof images.

These and other objects are accomplished in accordance with the teachings of the present invention by a DDCP system in which each proof request is constructed to contain only the parameter values, that are necessary for the DDCP system to generate each proof and filename(s) of the accompanying image data therefor, but not the image data itself. In this manner, each proof request is reduced in size from upwards of 100 Mbytes to approximately 200 bytes or less.

Specifically, the inventive DDCP system contains a raster image processor (RIP) which receives incoming multi-color interleaved contone image data from, for example, any one of a number of Color Electronic Prepress Systems (CEPSs), and is connected to and supplies halftone separation data to a proofing engine that generates a proof image directly from the separation data. Within the RIP, the proof requests are prioritized and queued in a proof request queue on a first-in first-out basis. For each proof request, the accompanying image data remains on the particular device, such as the CEPS, which generated that request. As the DDCP system is ready to generate each successive proof image, the RIP reads the proof request situated at the top of the queue and determines, based on the parameter values in that request, whether the proofing engine can generate a proof image for that particular request. For each such request, this determination would include, for example, ascertaining whether the proofing engine had a sufficient supply of an appropriately colored media to write that halftone separation data in a color specified in that request. In the event that the request at the top of the queue can be serviced, then the RIP reads the file(s) of the continuous tone (contone) image data specified in that request from the device on which it is stored; then, using appropriate hardware interfaces and software drivers, if necessary, de-interleaves the contone data into a separate file for each one of, e.g., the different cyan, magenta, yellow and black separations and then electronically screens the data in each of these files to generate halftone separation data therefor. The resulting halftone (screened) data for this proof request is then written to a hard disk file. Alternatively, if the proof request at the top of the queue can not be serviced, then the RIP proceeds to the next lower request in the queue, and so on.

To increase system throughput, two such hard disk files are used and collectively operated in a "ping-pong" fashion. Specifically, whenever the RIP is writing halftone image data onto one hard disk file for the next image to be proofed, the RIP is also simultaneously reading halftone image data for the current image being proofed from the other hard disk file and supplying this data to the proofing engine. The function of these two hard disk files switches after the data for each successive image is written to one of these files and read from the other. In this manner, the DDCP system can operate in a pipelined manner by appropriately processing the next sequential image to be proofed while the present proof image is being printed. As such, the RIP is not forced to remain idle throughout the entire time that the proofing engine is printing an image. This, in turn advantageously increases the throughput of the overall DDCP system.

Moreover, proof requests are generally entered at each of the CEPSS and electronically transferred into the RIP within the DDCP system without intervention by the DDCP system operator. By substantially, if not completely, eliminating the need for the DDCP system operator to manually enter proof requests, the burden placed on the DDCP operator is reduced and one source of human error is advantageously greatly reduced. Moreover, since each proof request consumes very little storage space, i.e. it contains only a small number of parameter values and filename(s) and collectively consumes approximately 200 bytes if not less but does not contain the image data, a substantial number of these requests can be queued at any one time, even in a relatively small hard disk file. As such, a large number of images can be set-up for successive proofing over a prolonged period of time without essentially any operator intervention to run the DDCP system, other than to, for example, initially ensure that the system has sufficient consumable supplies and to re-load these supplies as needed. By so reducing operator intervention and idling time to a minimum, the DDCP system is capable of continuously producing proof images over a relatively long period of time at or near its maximum system throughput.

In accordance with a specific embodiment of the inventive DDCP system, the proof request queue is formed of three separate queues: a queue of "rush" priority proof requests, a queue of "normal" priority proof requests and a queue of "hold" priority proof requests. The priority of any proof request is set by an operator at a CEPS station, or other device, at the time that request is formed. Those requests that have been assigned a rush priority are sequentially processed first, again on a first-in first-out basis, by the RIP and, in turn, forwarded to the proofing engine for printing ahead of any "normal" priority requests. A request with a "hold" priority is merely retained in the "hold" priority queue but is not processed until such time as its priority is changed or, as discussed below, it is included in a scatter proof request. The proof requests that reach the top of either of the "rush" or "normal" queues but can not be processed at the time they were read retain their place in their respective queue pending subsequent processing.

Through the RIP, specifically a personal computer interfaced thereto, the DDCP operator can edit the contents of each of the queues and each proof request therein. Because the image parameters that configure the proofing engine for any proof image form part of the request for that proof, the operator can change, as desired, the condition(s) under which any individual proof will be generated, e.g. by changing screen ruling and screen angle for any individual halftone separation. In addition, the DDCP operator can also re-prioritize the proof requests, re-arrange the order in which the proof images are successively generated, and even add or delete proof requests from each queue.

A particularly advantageous feature of the inventive DDCP system is its ability to provide scatter proofing. Specifically, "hold" priority proof requests are used to form scatter proof images, i.e. a proof image that itself collectively contains separate proof images in desired non-overlapping locations on one common page. After all the individual proof requests have been received for those images that are to collectively form a common scatter proof, the DDCP operator can combine each of these requests into a scatter proof request. To do so, the operator determines an appropriate upper left hand corner starting location for each separate image in the scatter proof as well as its height and width, and enters this position and size information along with the accompanying basic filename(s) for the associated image data file(s) therefor into a common "scatter" proof request. By doing so, the RIP effectively merges the individual proof requests for all the images that are to form the scatter proof into a common scatter proof request. Once a scatter proof request is established, the DDCP operator can assign it either a normal or high priority, after which this request is inserted into the appropriate priority queue and subsequently processed and printed in turn. By providing the ability to electronically compose a scatter proof prior to printing and hence without resorting to "cutting and pasting" of separate previously proofed images, as had heretofore occurred with prior art proofing systems, the inventive DDCP system advantageously provides added flexibility to the proofing process and significantly saves film, effort and cost.

Another advantageous feature of the inventive DDCP system lies in its ability to handle incoming image data from a wide variety and a large number of different CEPSs (or other input devices) and continue processing image data and generating associated proof images even if one of these CEPS fails. As described above, the DDCP system only obtains image data, through appropriate hardware interfaces and software drivers, from a CEPS whenever the DDCP system is ready to process that data and subsequently produce a proof image. As long as the required hardware interface, if any, is used to connect each CEPS, typically through a common network, to the RIP and appropriate software drivers reside in the RIP to properly translate the incoming proof requests and image data to a form usable by the RIP, nearly any number of different CEPSs can be connected to the DDCP system to feed proof requests and contone image data thereto. If one or more of the CEPSs fails and has a pending proof request in a queue, then, whenever that request reaches the top of that queue, the DDCP system will simply determine that it can not process that request at that time. As such, that proof request will merely retain its place in its associated queue until it can be processed by the RIP. The DDCP system will periodically recheck the availability of the failed CEPS to provide the requested contone image data and will obtain that data as soon as that CEPS becomes available in order to process that request and print the proof image therefor. As long as that CEPS remains unavailable, the DDCP system will process image data and generate proof images as requested by the then available CEPSs for proof requests that are situated at successively lower positions in the "rush" or "normal" priority queues.

BRIEF DESCRIPTION OF THE DRAWINGS

Figure 1A:
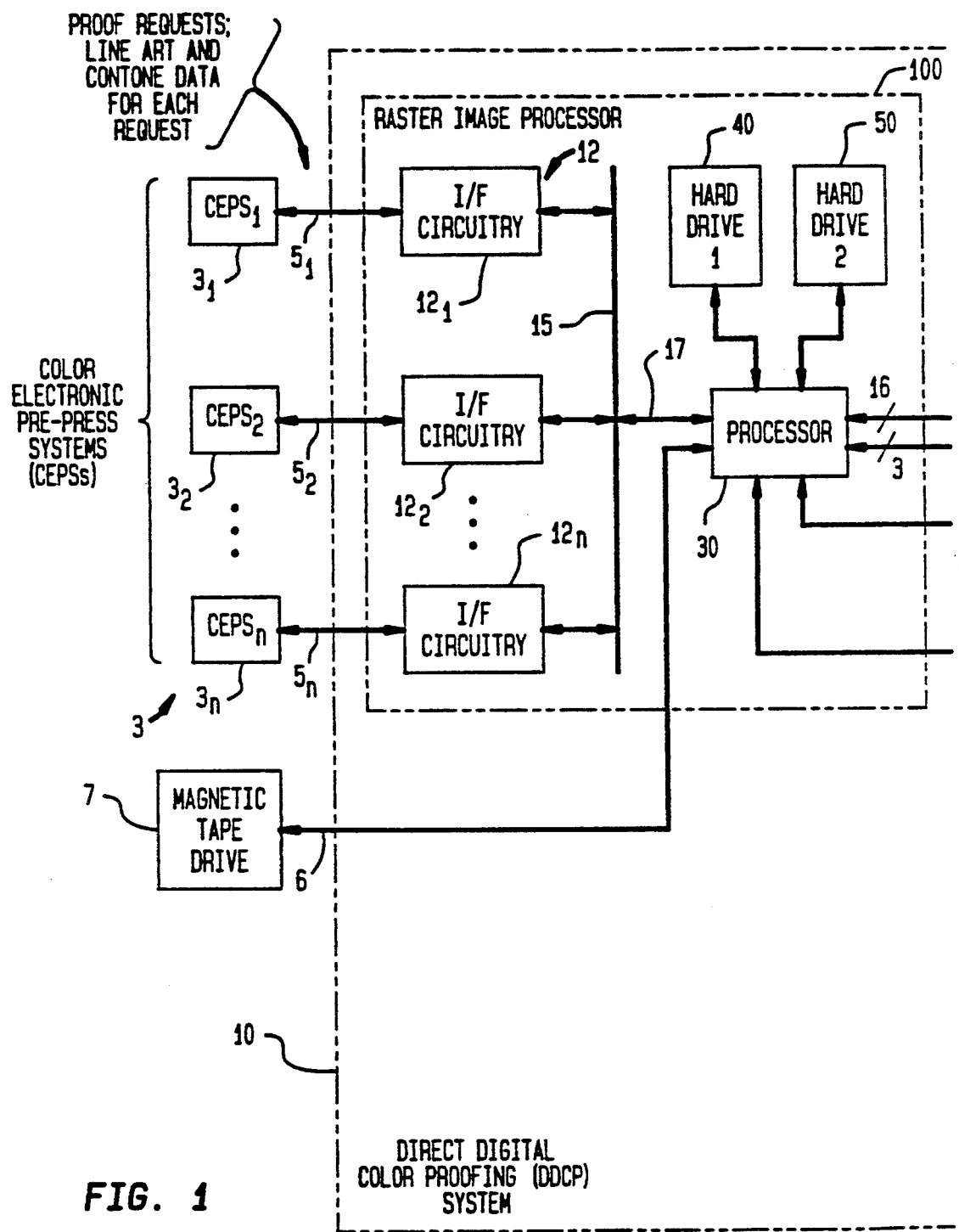
FIGS. 1A and 1B collectively depict a high level block diagram of Direct Digital Color Proofing (DDCP) system 10 that embodies the teachings of the present invention.
Figure 1:
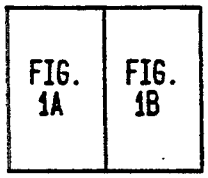
FIG. 1 depicts the correct alignment of the drawing sheets for FIGS. 1A and 1B.

The teachings of the present invention may be readily understood by considering the following detailed description in conjunction with the accompanying drawings, in which:

FIG. 2A depicts the data structure of a proof request;

FIG. 2B depicts the structure of image file description field 210 situated within proof request (queue element) 200 shown in FIG. 2;

FIG. 2C depicts image processing flags field 219 that forms part of image file description field 210 shown in FIG. 2A;

FIG. 2D depicts the structure of each one of pass parameter field 280 situated within proof request 200 shown in FIG. 2A;

FIG. 3 depicts a simplified flow diagram of the inventive manner in which an incoming proof request, illustratively request K, is handled by the raster image processor (RIP) within DDCP system 10 shown in FIG. 1 and specifically by processor 30 situated within the RIP;

FIG. 4 depicts a simplified flow diagram of the inventive manner through which accompanying image data for proof request K, shown in FIG. 3, is processed and subsequently stored within DDCP system 10;

FIG. 5 depicts a simplified flow diagram of the inventive manner through which stored image data for proof request K is read and subsequently printed to yield a proof image therefor;

FIG. 6 depicts first and last entry pointers for a simplified and empty proof request queue;

FIG. 7A depicts simplified empty proof request queue 705 prior to addition of a new proof request thereto;

FIG. 7B depicts simplified non-empty proof request queue 710 prior to the addition of a new proof request thereto;

FIG. 7C depicts simplified proof request queue 705 after new proof request 735 has been added thereto;

FIG. 7D depicts simplified proof request queue 710 after new proof request 735 has been added thereto;

FIG. 10 depicts proof request set-up screen display 1000, that is generated at any CEPS station or at operator PC 120 situated within DDCP system 10 shown in FIG. 1, for use by a operator in interactively generating a proof request;

FIG. 11 depicts proof request queue screen display 1100, that is generated at operator PC 120 shown in FIG. 1, for listing the current contents of the proof request queue 420 shown in FIGS. 3-5; and FIG. 12 depicts scatter proof request set-up screen display 1200, that is generated at operator PC 120 shown in FIG. 1, for use by an operator in interactively establishing a scatter proof request.

To facilitate understanding, identical reference numerals have been used, where possible, to denote identical elements that are common to various figures.

MODES OF CARRYING OUT THE INVENTION

After reading the following description, those skilled in the art will readily appreciate that our present invention can be used in a wide variety of different applications which employ queue based transaction processing in which each transaction processes a relatively large amount of accompanying data. Through our invention, the data for each request is isolated from and does not form part of each queued transaction request. In its place, a reference, in terms of a filename(s) for the data as well as an identification of a device on which the file(s) resides, is inserted into each request. Inasmuch as each request consumes very little memory space, a large number of these requests can be readily manipulated, edited and processed through a queue without the need to transfer any of the data files. Because the data for any request is read only from the device on which it resides during the course of processing that request after it has reached the top of the queue, and not while the request remains in the queue, use of our invention will greatly simplify queue based transaction processing and facilitate increased execution speed. Inasmuch as our present invention is particularly suited for use in a direct digital color proofing (DDCP) system in which each transaction request is a proof request with its accompanying data being incoming continuous tone ("contone") separation data for a corresponding image to be proofed, our invention will be specifically discussed in that context.

A. Overall System Description

Figure 1B:
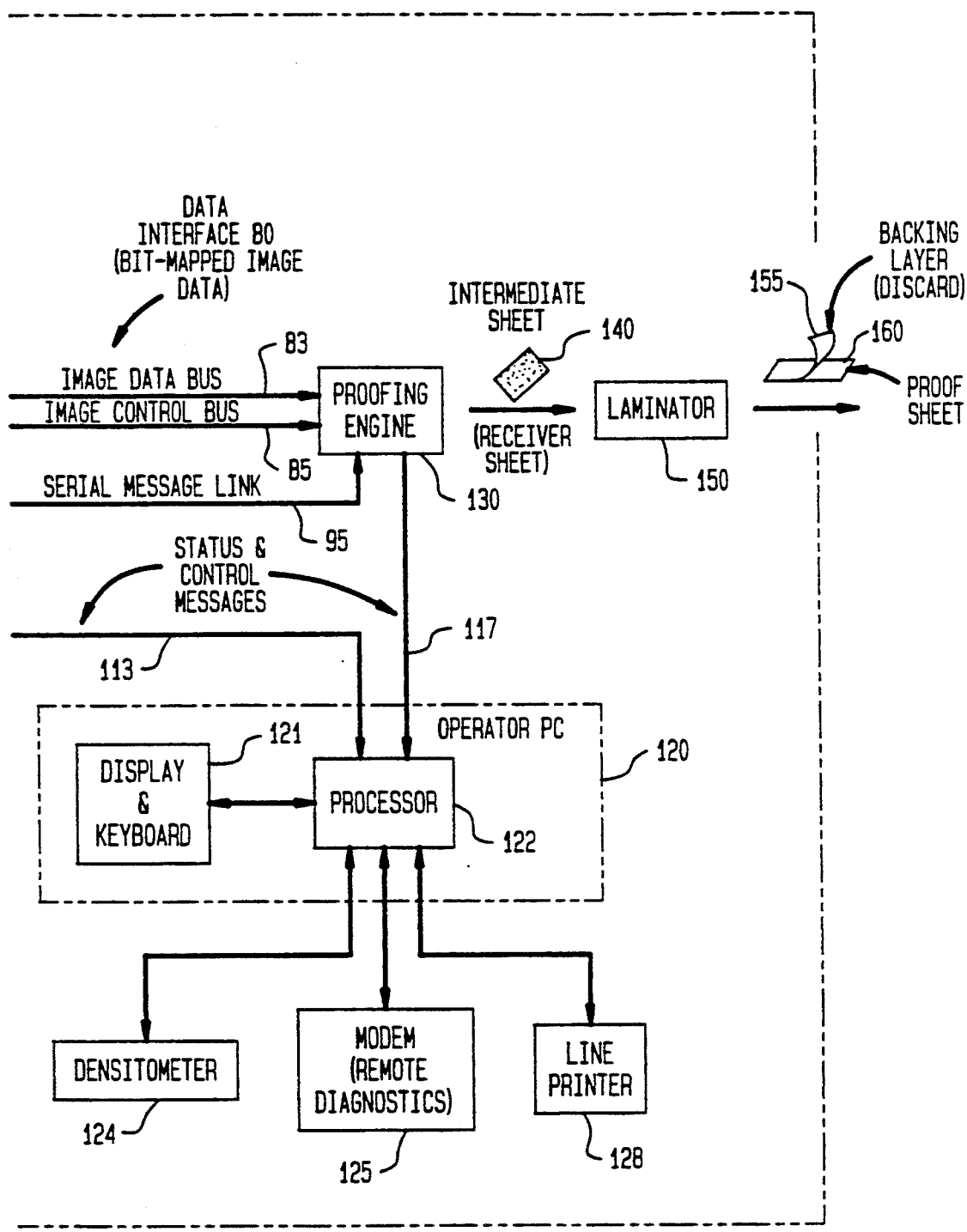

A block diagram of one embodiment of a DDCP system which embodies the teachings of our present invention is depicted in FIGS. 1A and 1B, for which the correct alignment of the drawing sheets for these figures is shown in FIG. 1.

As shown, DDCP system 10 is connected to and obtains continuous tone image data, via lines 5 (containing lines $5_1, 5_2, \ldots, 5_n$), for an image from any one of a number of color electronic pre-press systems (CEPSs) $3_1, 3_2, \ldots, 3_n$ that collectively form CEPSs 3. In essence, DDCP system 10 processes the contone image data for each image and generates an accompanying color proof image therefor on, for example, a paper medium. The resulting proof image after being transferred to the paper medium is referred to as a "proof sheet". Continuous tone image data can also be previously recorded on magnetic tape and, through magnetic tape drive 7, provided to DDCP system 10 for proofing.

The data provided by each CEPS is in the form of a file of successive contone values which, for each successive pixel within an image, are formed of interleaved contone values for the individual separation colors, e.g. values for cyan, yellow, magenta, and black (C, Y, M and B), therefor. Each of CEPSs 3 can be any one of a number of current commercially available color electronic pre-press systems.

For any image to be proofed, DDCP system 10 digitally manipulates the contone separation values provided by any of the CEPSs by first de-interleaving these values into individual contone separation files, then digitally generates a halftone separation file for each of the individual contone separations by, for example, inter alia, electronic screening and dot gain compensation, and then directly writes a composite color proof image for all these halftone separations using an appropriate marking engine (henceforth referred to as a "proofing engine").

DDCP system 10 contains raster image processor (RIP) 100; proofing engine (PE) 130; operator personal computer (PC) 120 and its associated peripherals: densitometer 124, remote diagnostic modem 125 and line printer 128; and laminator 150. Each of CEPSs $3_1, 3_2, \ldots, 3_n$ is connected within RIP 100 through an appropriate hardware interface $12_1, 12_2, \ldots, 12_n$, which collectively form interfaces 12, to CEPS bus 15 which, in turn, is connected to processor 30. This processor is a conventional microcomputer system. Hard disks 40 and 50 (also denoted as hard disks 1 and 2) are also connected to processor 30 and provide temporary storage of processed halftone image data generated by this processor. Each of these hard disks contains an image file, with both of these files collectively operating, as discussed in detail below, on a "ping-pong" basis such that processor 30 writes halftone image data for the next image to be proofed into one of these files, while it reads halftone image data for the current image being proofed from the other file and applies that data to the proofing engine. The processor alternates the function of each of these files between reading and writing as data for successive images to be proofed is applied to the DDCP system.

RIP 100 is connected to proofing engine 130 through serial message link 95 which carries status and error messages, commands and parameters between these units on a serial basis. Data interface 80, which is formed of sixteen-bit parallel (active high) image data bus 83 and image control bus 85, is used to transfer halftone image data in sixteen-bit parallel form (for transferring halftone data for sixteen successive pixels at a time) from the RIP to the proofing engine. The RIP pads, as necessary, each micro-raster of the image to a sixteen-bit word boundary and, prior to the transfer of data across data bus 83, notifies the proofing engine, via serial link 95, as to the number of halftone bytes existing on each line of the proof image. This number is a constant for each image. Image control bus 85 contains three separate lines (not specifically shown): data ready, data request and data acknowledge, which are collectively used by RIP 100 and proofing engine 130 to implement a simple interlocked handshake protocol to transfer each successive sixteen-bit data word between these components. In particular, to transfer a sixteen-bit data word, RIP 100 asserts a signal (active low) on the data ready line (the "data ready signal") to inform the proofing engine that data transfer is to begin. Thereafter, to obtain this data word, the proofing engine asserts a signal (active low) on the data request line (the "data request signal"). Once this assertion is detected by the RIP, the RIP places the sixteen-bit data word onto image data bus 83 and then asserts a signal (also active low) on the data acknowledge line (the "data acknowledge signal"). Once the proofing engine reads this data word and then, in response to the asserted data acknowledge signal, the engine de-asserts the data request signal. In response to this, the RIP de-asserts the data acknowledge signal thereby completing an interlocked handshake operation and the accompanying successful data transfer. On the rising edge of the data acknowledge signal, the proofing engine loads the incoming sixteen-bit data value into an internal holding first-in first-out (FIFO) circuit (not shown). These steps are then repeated in seriatim for each successive sixteen-bit data word that is to be transferred from RIP 100 to the proofing engine for the current image to be printed. After all the halftone data has been transferred for a given proof image, the RIP will de-assert the data ready line. For each proof that is to be printed, the RIP successively transfers to the proofing engine the complete bit-mapped halftone image data, as a succession of sixteen-bit words, for each separate halftone separation image that is to form the proof.

Operator PC 120, containing display and keyboard 121 and processor 122, is a conventional personal computer that is interfaced through serial links 113 and 117 to both RIP 100, specifically processor 30 therein, and proofing engine 130. This PC permits a DDCP operator to monitor and interrogate the status of as well as control both RIP 100 and proofing engine 130 and perform diagnostic and set-up operations thereon, as desired. Densitometer 124, under control of operator PC 120, is used to measure the density of various test patches generated by the proofing engine in order to calibrate its performance. Modem 125 provides a dial-up telephone link for use in remotely diagnosing any abnormalities that may occur within the DDCP system. Line printer 128 can be used by the DDCP operator to provide a local printout of desired information.

Proofing engine 130 is preferably a multi-laser sublimation dye transfer binary marking engine. In essence, to print a proof image by the marking engine, a receiver sheet (i.e. a film media with a transfer layer) of appropriate dimensions is automatically cut and wrapped onto a rotating drum (not shown) within the engine. Thereafter, to generate a particular C, Y, M or B separation, a respective C, Y, M or B dye donor sheet is first spooled off a supply reel within the engine and superimposed, in proper registration, onto the receiver sheet with an emulsion side of the donor sheet contacting the receiver sheet. Thereafter, a bit-mapped image for an appropriate halftone separation is written by the proofing engine onto the donor sheet by selectively exposing that sheet, using a writing laser, at each location where a dot is to appear. At each such location, the exposure causes a controlled amount of dye to migrate (transfer) from the donor sheet to the top of the transfer layer of the receiver sheet. For each dot, the intensity of the light produced by the writing laser determines the amount of dye that transfers to the receiver sheet. The donor sheet is then removed from the receiver sheet. This process is then repeated using a differently colored donor sheet for each remaining separation. In addition, the proofing engine can accommodate differently colored receiver sheets. Furthermore, the marking engine can also accommodate two specially colored donor sheets and write accompanying separations thereon for transfer to a receiver sheet. The special colors and accompanying separations are used to generate an exact shade of either two desired colors, such as "KODAK" yellow, or of colors that are not within the color gamut defined by cyan, yellow, magenta and black, e.g. "Hot" pink, phosphorescent, pastels or gold colors. (KODAK is a registered trademark of the Eastman Kodak Company of Rochester, N.Y. which is also the present assignee hereof.) Once proofing engine 130 writes all the separations for a particular proof image onto a receiver sheet, the engine ejects that sheet as intermediate sheet 140. At this point, the entire proof image is situated on the top of the transfer layer of the receiver sheet that forms intermediate sheet 140. In order to transfer the proof image from the intermediate sheet to paper media, in order to form a so-called "proof sheet", the DDCP operator manually inserts intermediate sheet 140 along with a sheet of prelaminate material and a sheet of press stock into laminator 150. Laminator 150 is not electrically connected to any of the components within DDCP system 10. Once the operator feeds these sheets into the laminator, it first prelaminates the press stock to the intermediate sheet and then laminates the transfer layer to the press stock. Once lamination is completed, a laminated page emerges from the laminator with the transfer layer containing the proof image fused to the press stock. The operator then peels off and discards intermediate layer 155, which is a backing layer, and then retains proof sheet 160 containing the proof image. For purposes of the present invention, any one of a number of other types of proofing engines could also be used. Inasmuch as the proofing engine and the laminator do not form part of the present invention, they will not be discussed in any further detail below.

In order to generate a proof image, an operator situated at any of CEPSs 3 formulates a proof request through a keyboard and an interactive menu based display provided thereat (see, e.g., that shown in FIG. 10 and discussed in detail below). The proof request, as defined below and shown in FIGS. 2A–2D, contains those parameter values and file name(s) that are necessary, when proofing resources are available, to set-up the DDCP system to generate a proof image. The parameter values define the manner through which the contone image data for the proof image is to be processed by the RIP, such as by defining screen rulings and angles, separation sequence, number of copies and the like, and then printed by the proofing engine. The file name(s), which are defined by the CEPS operator, specify the names of the data file(s) that reside on the CEPS and contain the interleaved contone image data for that proof image. Note however, that the proof request does not however contain the image data itself but only an identification of the file(s) which stores that data. By eliminating image data from each proof request, the size of each proof request is substantially reduced from upwards of approximately 100 MBytes (for image containing both contone data and linework) to approximately 200 bytes.

After a proof request has been entered, the particular CEPS on which it is entered will transmit that request to DDCP system 10 and specifically to RIP 100. Proof requests can be entered either while the DDCP system is currently processing a prior proof request, printing a proof image or performing neither operation. RIP 100 maintains a proof request queue within one of the two hard files, illustratively within hard disk 40. This queue, as discussed in detail below, contains three separate queues: a "rush" queue, a "normal" queue and a "hold" queue. Based upon the priority accorded to the request by the operator, i.e. rush, normal or hold, RIP 100 places the incoming request at the bottom of the appropriate queue. Those requests that have been assigned a rush priority are sequentially processed first, again on a first-in first-out basis, by the RIP and, in turn, forwarded to the proofing engine for printing ahead of any "normal" priority requests. A request with a "hold" priority is merely retained in the "hold" priority queue but is not processed until such time as its priority is changed or, as discussed below, it is incorporated into a "scatter" proof request. A scatter proof is a proof that contains a number of non-overlapping images, here arising from separate proof requests, that are printed on a common proof sheet.

Through operator PC 120 and specifically through interactive menu based screen displays generated thereat and as discussed in detail below specifically in connection with FIGS. 6–8B and 10–12, the DDCP operator can edit the contents of each of the queues and each proof request therein. Because the image parameters that configure the proofing engine for any proof image form part of the request for that proof, the operator can change, as desired, the condition(s) under which any individual proof will be generated, e.g. by changing screen ruling and screen angle for any individual halftone separation. In addition, the DDCP operator can also re-prioritize the proof requests, re-arrange the order in which the proof images are successively generated, and even add or delete proof requests from each queue.

The RIP begins processing a particular proof request once that request reaches the top of its associated queue. To simplify matters for purposes of the ensuing discussion, the proof request queue will be assumed, on a simplistic basis, as containing only one queue. Specifically, after the most recently occurring request has been fully processed, the RIP reads the next proof request situated at the top of the queue. Once this request has been read, the RIP determines, based upon the parameter values specified in that request and current system resources, whether a proof image for that request can be currently printed or not. In this regard, for example, if the request specifies a particular media color, the RIP determines through querying proofing engine 130 whether media for that color has been loaded into the engine and whether sufficient supplies of that media exist to generate the proof. Similarly, if a special color donor sheet is specified, the RIP inquires as to whether that donor sheet is available, and so forth for other consumable items.

If the RIP determines that appropriate system resources exist to generate a proof image for this request, then the RIP obtains the appropriate contone data file(s) from the CEPS that generated this request. These appropriate file name(s) and an identification (device number) of this CEPS are specified within the proof request. For example, for a proof request generated from CEPS $3_2$, RIP 100, as shown in FIGS. 1A and 1B, sends an instruction containing the file name(s) specified in that request for the accompanying contone data to this CEPS. In response, the CEPS reads the file(s) and supplies the data over line $5_2$ to RIP 100. This data will be routed through the appropriate interface circuitry, such as circuitry $12_2$, which provides an appropriate hardware interface for this CEPS to the RIP. The data is then routed, via CEPS bus 15, to processor 30 situated within RIP 100. The processor will first translate this data, if necessary through an appropriate translation routine, into a form compatible with RIP programming. This may include, for example, inverting density values where on a particular CEPS a "0" eight-bit contone value may indicate full density, while on the DDCP the same value would indicate no density. To provide compatibility across many different CEPSs, separate hardware interfaces and software translation routines, to the extent needed, will exist within the RIP for each different CEPS. As such, the DDCP can function with a wide variety and nearly any number of different CEPSs that are interfaced to CEPS bus 15. After the contone data has been appropriately translated, RIP 100 will electronically screen the data for that separation to generate a halftone separation for each different color. Thereafter, the RIP will store all the data for the halftone separations for the current image being processed in either hard file 40 or 50. At the same time, the RIP is reading halftone image data for the image that has most recently been processed and is applying that data over data interface 80 to proofing engine 130 to generate a proof image therefor. As noted above and to increase throughput, the RIP pipelines the image processing and printing functions. Specifically, while processed halftone image data is being read from one hard file and printed, newly processed image data for the next image to be printed is being stored on the other hard file. Under the control of RIP 100, each of the hard files reverses its function with each successive image. Operating the hard disks in this fashion increases the throughput of proof images through the DDCP and allows the system to produce a relatively steady stream of images through the system at or near that of the proofing engine. Therefore, assuming that the RIP is currently reading halftone image data from hard file 50 for printing, newly processed image data for the current image being processed will be stored on hard file 40. Once all the data has been supplied from hard file 50 to proofing engine 130 in order to print the most recently processed image, then, shortly thereafter, RIP 100 will read the halftone image data stored on hard file 40 and supply it to the proofing engine for printing, with this process being repeated for successive images to be proofed. Inasmuch as the particular image processing that occurs to the contone image data by RIP 100 does not form part of the present invention, this processing will not be discussed in any further detail below.

The proof requests that reach the top of either of the "rush" or "normal" priority queue but can not be processed by the RIP at the time they were read retain their place in their respective queue pending subsequent processing. Proof requests can also be entered by the DDCP operator through operator PC 120 and specifically using menu driven interactive screen displays and keyboard entry through display and keyboard 121.

B. Proof Request Structure

FIG. 2A depicts the data structure of a typical proof request. This request is stored within the proof request queue as proof request (queue element) 200. Request 200 contains a succession of fields, with their accompanying reference numbers, listed and described below in Table 1.

TABLE 1

Proof Request Fields

| Item | Description |
| --- | --- |
| Pointer to next entry (205) | Pointer to next entry (proof request queue element — PRQE) in a linked list, that forms a queue, (rush, normal or hold) which holds this proof request; |
| Input file description (210) | Data structure which specifies: characteristics of the particular contone data to use in generating a proof image; file, device and page names for this data; and various image processing flags to enable/disable corresponding imaging features; |
| Output color order (225) | String defining the order of cyan, magenta, yellow, black, one film "special" color and/or two |

TABLE 1-continued

Proof Request Fields

| Item | Description |
|---|---|
| | additional "special" separation colors for use in up to five successive halftoning passes for a common proof image; |
| Screen ruling (230) | Floating point value between 65–200 lines/inch continuous (approximately 25.59–78.74 lines/cm) which specifies the screen ruling to use for all the separations; |
| Dot font (235) | Byte specifying dot font, e.g. diamond, elliptical, square, round, composed gravure or composed dupli; |
| Description (240) | Optional text for a data legend to be printed on the side of the proof image; (string); |
| Number of proof copies (245) | Integer value from 1-50 designating number of copies of a proof image to print (byte); |
| Upper left hand corner x coordinate position (250) | Integer value (in mm) defining the x position of the upper left hand corner of an image to be proofed relative to the media sheet (also referred to as Expose Offset w) -- only required for use in a scatter proof request; |
| Upper left hand corner y coordinate position (255) | Integer value (in mm) defining the y position of the upper left hand corner of an image to be proofed relative to the media sheet (also referred to as Expose Offset h) -- only required for use in a scatter proof request; |
| Scatter proof enable (260) | Boolean value specifying whether this proof request can be part of a scatter proof request. If this enable is not set, then the associated request will not be included in a scatter proof request regardless of whether the associated request has been given a "hold" priority; |
| Priority (265) | Byte specifying rush, normal or hold; |
| Extra Separation Names (270) | Strings (up to two) which specify the file names of up to two extra (additional) separations that are to be generated for the proof image; |
| Recipe Color Number (275) | Strings (up to two) which specify the number of a special color to be used for printing a separation; and |
| Pass parameters (280) | Data structure specifying parameter values particular to each halftone printing (writing) pass that is to be undertaken by the proofing engine. |

As indicated in FIG. 2B, image file description field 210 is itself a data structure that, among other things, contains a succession of names and parameter values pertinent to the particular contone data to use in generating a proof image for this request. Specifically, the constituent fields in field 210 are listed, with their accompanying reference numbers, and described below in Table 2.

TABLE 2

Image File Description Fields

| Item | Description |
|---|---|
| CEPS Device Name (211) | String that specifies the name of the CEPS (or other device) on which the contone data file(s) reside; |
| Job Name (212) | String that defines a job name for the current proof request. Fields 211 and 212 are automatically established for this proof request once the CEPS (or DDCP) operator establishes a pathname at the CEPS (or the operator PC) for the contone file(s); |
| Page Name (213) | String which identifies the name of the particular page in the artwork to be proofed through this request; |
| Image Name (214) | String which identifies the name of the particular image in an artwork to be proofed through this request; |
| CT resolution (215) | Integer value that specifies the resolution of the contone image file(s) to be proofed through this request; |
| LW resolution (216) | Integer value that specifies the resolution of the accompanying linework file(s) to be proofed through this request; |
| Image Height (217) | Integer value (in mm) that specifies image height; |
| Image Width (218) | Integer value (in mm) that specifies image width; and |
| Image Feature Flags (219) | Byte containing various boolean flags to control various image processing and printing functions. |

Image feature flags 219, as specifically shown in FIG. 2C, contain separate boolean fields for the functions of, inter alia: image scaling, rotation, mirror orientation, control strip enable and data legend enable. Specifically, the scaling ("Scale to Fit") flag, if set, permits the RIP to scale the size of the image, if needed, to fit the dimensions of a proof image area that has been defined on the media on which the proof will be generated. Similarly, the rotation ("Rotate Image") flag, if set, permits the RIP to rotate the image by 90°, if needed, to fit the proof image area. The mirror ("Mirror Image") flag instructs the proofing engine, through the RIP, to change the orientation of the image, in a fast scan direction, based on whether the contone data was stored in a so-called "mirrored" format by a CEPS which generated this request. The control strip enable flag, if set, instructs the RIP to print a control strip on the edge of the proofed image as it is being printed. The control strip consists of a series of single color test patches for use in subsequent densitometric measurements of the proofing process. Lastly, the data legend enable flag, if set, instructs the RIP to print a data legend, as specified in description field 240 shown in FIG. 2A, on the edge of the proofed image as it is being printed.

As indicated in FIG. 2D pass parameters field 280 is itself a data structure that is replicated up to five times and contains parameter values pertinent for each successive halftoning pass that is to be performed by the proofing engine to generate a proof image for the associated request. Inasmuch as four separate passes can occur for the four different donor sheet colors and a separate pass can occur for a special colored media sheet, five separate halftoning passes can be specified in a proof request. Although the proofing engine can accommodate a different specially colored media as well as a normal media, only one such media can be used generate any one proof image. The order of these passes is that specified in output color order field 225 shown in FIG. 2A. Therefore, the first occurrence of field 280 is for the first halftoning pass specified in output order field 225, the second occurrence of field 280 is for the next successive halftoning pass and so on for each of the remaining passes. Specifically, the constituent fields that form each one of pass parameter fields 280 are listed, with their accompanying reference numbers, and described below in Table 3.

TABLE 3

| Item | Pass Parameters Fields Description |
|---|---|
| Screen angle (281) | Floating point value between ±180° continuous specifying the screen angle for a corresponding pass; |
| Dot gain table (283) | String which identifies a dot gain table to use in this pass; and |
| Solid area density (285) | A signed byte between the values ±22 for a halftoning pass for a donor sheet color, or between ±99 for halftoning pass for a special media color. |

C. Pipelined Proof Request Queuing, Processing and Printing, and Associated Software Routines Now, with the above in mind, the discussion will specifically address the pipelined operation occurring within the RIP to handle proof requests and the use of proof request queues therein.

FIGS. 3–5 collectively depict a simplified flow diagram of the pipelined manner in which the RIP handles successive proof requests. Specifically, these figures diagrammatically illustrate the overall manner through which the RIP handles illustrative incoming proof request K, then processes this request and stores the resulting halftone image data therefor within DDCP system 10, and finally reads this data and subsequently prints a proof image therefor through proofing engine 130. These figures also show the pipelined manner through which the RIP handles other proof requests, illustratively requests I and J, that precede request K. To facilitate understanding, the reader should simultaneously refer to FIGS. 3–5 throughout the course of the following discussion.

To start, assume, as shown in FIG. 3, that RIP 30 has completely processed contone image data for proof request I and has stored halftone data therefor within halftone image data file 510 situated on hard disk 50. As depicted in this figure, RIP 30 then reads the image data from this file, through disk input/output routines 340 and as symbolized by lines 343 and 347, and combines, as represented by dashed lines 353, this data with appropriate proof parameter values as set forth in proof request I and supplies the resulting parameter and data stream, using proofing engine (PE) driver routine 350, to proofing engine 130. This driver routine also appropriately rasterizes the halftone data prior to applying it to the proofing engine. As such, proofing engine 130 will print proof image for proof request I. Let us assume that while this image is being printed, RIP 30 is also receiving and processing incoming contone data for next successive proof request J. As symbolized by line 325, the incoming contone data for this request is processed, within RIP 30, by image processing routines 330. These routines include, inter alia, translation routine 332, de-interleaving routine 334 which screening routine 336, and collectively, as functionally discussed above, translate the incoming contone data into an appropriate form for subsequent use by the RIP, de-interleave the translated data into separate separation files and finally screen each of the separation files to generate halftone separation data therefor. Inasmuch as hard file 50 is already occupied in reading data for application to the proofing engine, the screened halftone data generated by image processing routines 330 is routed, via disk input/output routines 340 and as symbolized by line 337, into halftone image data file 410 situated on hard disk 40. Hence, RIP 30 is writing halftone data into disk 40 while it is simultaneously reading halftone image data from disk 50.

Now, while these processes are underway, let us assume that incoming proof request K appears on CEPS bus 15, as symbolized by circled number 1. In response to this request, RIP 30, through queue handling routines 310, as discussed in detail below, merely inserts, as symbolized by line 313 and circled number 2, this incoming request into the bottom of proof request queue 420, and specifically into either rush queue 423, normal queue 427 or hold queue 429 based upon the priority assigned to this request.

Contone data processing for proof request J and halftone data reading and image printing for proof request I will simultaneously continue until these functions are completed. Once contone image data has been completely processed for a given proof request, that request therefor is deleted from the proof request queue. After a proof has been completely printed by the proofing engine, its associated halftone data is erased from either halftone image data file 410 or 510 on which it was temporarily stored. To again simplify matters, let us assume that proof request K is now at the top of the normal queue and is next in line to be processed.

Once, proof image I has been completely printed and all the halftone image data has been stored for request J, RIP 30 then reads the corresponding halftone separation data for proof request J from halftone image data file 410 on hard disk 40 and routes this data along with its accompanying parameter values set forth in request J, as symbolized by lines 348 and 353, to proofing engine 130 for printing. Proof image J will be generated and will emerge from the engine as a result. Once RIP 30 begins reading file 410 to print proof image J, proof request analysis and data access routines 320 will instruct, as symbolized by line 322, queue handling routines 310 to obtain the next proof request in the proof request queue 420. As such, RIP 30, through queue handling routines 310, will, then, as symbolized by circled number 3, read the next proof request in the queue, i.e. request K. Once this request is read, queue handling routines 310 pass this request, as symbolized by line 324, to proof request analysis and data access routines 320. These latter routines, in conjunction with resource information supplied by the operator PC and/or the proofing engine, determine whether proof request K can be processed at this time to generate a proof image. If it can not be processed, then routines 320 merely instruct queue handling routines 310 to obtain the next successive request in the queue, and so on.

Alternatively, in the event that routines 320 conclude that request K can now be processed, then these routines, as symbolized by line 326 and circled number 4, obtain the contone data in the contone data file(s) needed to process this request from the CEPS (or other device) on which these file(s) resides. In essence, RIP 30 merely constructs an instruction containing the device and file names specified in the proof request and broadcasts that request onto CEPS bus 15. The particular CEPS (or other device) that contains these files will then respond by simply reading the contents of these files onto the bus. The incoming contone data, symbolized by circled line 5, is routed, as represented by line 331, to image processing routine 330 for, as represented by circled number 6, translation, de-interleaving and screening. The resulting halftone image data for proof request K is applied through disk input/output routines 340, and as symbolized by line 338 and circled number 7, to hard disk 50 for storage within halftone image data file 510. Hence, as halftone image data is being read by RIP 30 from hard disk 40 and printed by proofing engine 130 to generate proof image J, the RIP is writing halftone image data for proof image K onto hard disk 50. Once all the halftone image data has been generated for request K, that request is removed from the queue.

Now, after the proofing engine has fully generated proof image J and the halftone image data for request K has been completely stored within file 510 on hard disk 50, RIP 30, specifically through disk input/output routines 340, as symbolized by circled number 8, will read the stored halftone image data for request K from halftone image data file 510, and apply, as represented by line 349, this data to PE driver routine 350. This driver routine will combine, as symbolized by dashed line 353 and circled number 9, this halftone image data with the appropriate parameter values, situated within proof request K, and apply a resultant data stream to proofing engine 130. In response to this, proofing engine 130 will generate, as symbolized by circled number 10, proof image K for this request. The above pipelined process will continue as long as more than one proof request remains to be printed.

While the software thusfar discussed has been described in fairly high level functional terms, the specific implementation of all of this software will be readily apparent to anyone skilled in the art given, inter alia, the particular design chosen for RIP 30. In addition, the software executing on the RIP will, of necessity, include an operating system (as well as other associated routines) to control and administer the RIP, but, which apart from a multi-tasking capability as discussed below, does not form part of the present invention. As such, to simplify the following discussion, we will now address the salient specific features of a multi-tasking operating system for use in RIP 30 and specific image based processes executing thereon, as well as, in Tables 4 and 5, two pseudo-code routines that govern the transfer of image data for each proof request and the manner through which each proof request is processed.

The operating system is preferably a multi-tasking operating system—the specific implementation of which will be readily apparent to anyone skilled in the art. Through this system, individual software processes (tasks), whether identical or not, can exist as independent programs. In addition, this operating system supports "controlled dependence" through which a process can wait for the availability of an input/output device which has previously been dedicated to another process. This system provides well-known software mechanisms through which a process (executing software program) can exist in either of two states: running or blocked. Specifically, a process is allowed to "block" itself whenever a resource critical to its execution, such as illustratively an input/output device, is not available. A process is also allowed to "unblock" another process whenever it releases a critical resource that has been requested by that other process.

To control the proofing engine, a series of identical re-entrant processes, though typically staggered in time, will co-exist under the operating system. Each process governs transfer of image data for a corresponding proof image to the RIP, processing of this data into halftone data, storage of this data onto an appropriate hard disk file, and subsequent printing of this halftone data by the proofing engine to yield a proof image therefor. Specifically, a first process will attempt to initiate a file transfer of image data for a current proof request to be processed. A free disk list will contain the identifiers for both hard disks 40 and 50 shown in FIGS. 3–5. If the first process finds an available disk, such as, for example, disk 40, this process commences and starts the transfer of image data, from a corresponding CEPS and through image processing routines 330, to that available hard disk, specifically to halftone image data file 410 on disk 40. While the first process is occurring with data being transferred to hard disk file 410, a second process can be triggered to initiate a second file transfer for the next successive proof request in the associated queue. If a second hard disk, such as hard disk 50, is available at this time, then transfer of image data for this request, from a corresponding CEPS and again through image processing routines 330, can proceed to the associated hard disk file, such as halftone image data file 510. Inasmuch as both hard disk files would now be busy, a third process which subsequently occurs will be blocked due to unavailability of a hard disk and will simply wait for either hard disk to become available once again. Subsequently, at some point, the halftone data for the request associated with the first process will be completely transferred to hard file 410. At this point, the first process will attempt to allocate proofing engine 130 to write the now stored halftone data for this process. If the proofing engine is available, it will be allocated by the operating system to this process with the associated halftone data being rasterized and transferred, both through PE driver routine 350, to the proofing engine for writing. Whenever the second process has finished storing its associated halftone image data into hard file 510, the second process will now become blocked and will wait for proofing engine 130 to complete writing a proof image for the first process and become available once again. As soon as the proof image for the first process is completely written, the first process will unblock the second process which, in turn, will attempt to allocate the proofing engine to itself. Once proofing engine 130 is so allocated, the second process will commence rasterizing and transferring its associated halftone image data to the proofing engine for writing. Furthermore, since the first process is fully completed, it will also de-allocate halftone image data file 410 and unblock the third process such that this latter process can allocate this data file to itself and thereafter store process halftone image data therein. Processing of such tasks will occur in seriatim until all pending "rush" or "normal" priority proof requests pending in the proof request queue have been fully processed and proof images written therefor.

In view of the above discussion, the pseudo-code for a routine, specifically the Process_A_Proof_Request Routine, which establishes a task to process a next proof request from the proof request queue and handle the transfer of halftone image data therefor is provided in Table 4 below. In addition, the pseudo-code for a routine, specifically the Process__An__Image__Transfer__Request Routine, which controls the transfer and processing of an image file(s) from the CEPS (or other device) to the appropriate hard file, and is called within the Process__A__Proof__Request routine, is shown in Table 5. Based upon the detailed discussion above of the multi-tasked operation of the RIP, the description of the pseudo-code for both of these routines will be completely self-evident to those skilled in the art from the discussion and the following pseudo-code.

TABLE 4

Process__A__Proof__Request Routine

Process__A__Proof__Request: Procedure Re-entrant
  Receive a Proof Request from a queue
  Interrogate a Free Disk List to determine if a
    hard disk is available to store halftone
    separation data that will result from processing
    this request
  If(a hard disk is not available)
    then
      Block this process while waiting for a hard
        disk to become available
    endif
          /*a hard disk was found in the available
            list
  Allocate the free hard disk to a file transfer
    process, read an accompanying destination
    identifier obtained from the Free Disk list
  Extract the CEPS Device name, Job name, Page name
    and Image name fields from the proof request
    just obtained from the queue
  Initiate, through Process__An__Image__Transfer
    Request Routine, a transfer of the image
    file(s) from the CEPS (or other device) with the
    given job, page and image names. The destination
    identifier that has just been read specifies the
    destination hard file for this transfer.
  Block this process pending completion of this
    transfer
          /*the halftone image data has now been
            combined with the Proof Request within
            the current process
  Interrogate availability of the proofing engine
  If(a proofing engine available flag is not set)
    then
      Block this process awaiting availability of the
        proofing engine
    endif
  Allocate the proofing engine to the current
    process by clearing the proofing engine available
    flag)
  For(each halftone writing pass indicated in the
      proof request)
    Extract the pass parameters, for the current
      pass, from the Proof Request
    Send a pass request containing the extracted pass
      parameters to the proofing engine
    Signal a rasterizing process within the RIP,
      specifically within PE driver routine 350, to
      write accompanying halftone image data from the
      associated hard file to the proofing engine
    Block this process awaiting completion of the
      current pass
  endfor
  Set the proofing engine available flag to signify
    an available status
  IF(a process is blocked awaiting the proofing
    engine)
    then
      Unblock the process waiting for the proofing
        engine
    endif
  Deallocate the hard disk file indicated by the
    destination identifier
  If(a process is blocked awaiting a free disk)
    then
      Unblock the process awaiting a free disk
    endif TABLE 4-continued Process__A__Proof__Request Routine End Process__A__Proof__Request.

TABLE 5

Process__An__Image__Transfer__Request Routine

Process__An__Image__Transfer__Request Routine: Procedure
  Send a file transfer request to the CEPS (or other
    device) to obtain contone image data for file(s)
    specified in the job name, page name and image
    names
  Do
    Get a block of contone image data from the CEPS
      (or other device)
    Translate the image data block appropriately,
      de-interleave the translated block into separate
      separation blocks, and screen the separation
      blocks (all using image processing routines 330)
    Write the screened data to the destination hard
      disk file
  until(an End of File Transfer is indicated from
    the CEPS (or other device))
  Unblock the process waiting for the transfer to
    finish
  End Process__An__Image__Transfer__Request.

D. Proof Request Queue and Associated Software Routines

The manner through which the proof request queue can be edited to add and delete requests therefrom will now be discussed in conjunction with FIGS. 6-8B. Inasmuch as the each of the three queues, i.e. the "normal" "rush" or "hold" queues, can be edited in an identical fashion, FIGS. 6-8B will, for simplicity, illustrate only one of these queues.

FIG. 6 depicts proof request first and last entry queue pointers 610 and 620 for an empty queue. A queue is implemented as a linked list within file 420 residing on disk unit 40, as shown in FIGS. 3-5. As shown in FIG. 6, if the queue is empty, then both the first and last pointers contain a null relative address value.

In the event a proof request (entry) is to be added to a queue, then the queue will either be first empty as is queue 705 shown in FIG. 7A, or contain prior entries as in queue 710 shown in FIG. 7B. In the event the queue is empty, then first and last entry pointers 610 and 620 will both contain the null value. Alternatively, if the queue contains prior proof requests, such as first and second proof requests 715 and 725, then first entry pointer 610 will point to the first relative address location of proof request 715. Next request pointer 713 (which is pointer field 205 shown in FIG. 2A) situated within request 715 will, in turn and as shown in FIG. 7B, point to the starting location, typically in relative address form, of second proof request 725. Inasmuch as no further proof requests exist in queue 710, then next request pointer 723 situated within request 725 will contain the null value and last entry pointer 620 will point to the relative address starting location of request 725.

FIG. 7C shows the manner in which new proof request 735 is added to empty queue 705 shown in FIG. 7A. Specifically, the contents of both the first and last entry pointers are changed from the null value to the relative address of the first location of new entry 735. Since this request is now the only request in queue 705, next request pointer 733 situated within this request will be set to the null value.

FIG. 7D shows the manner in which new proof request 735 is added to queue 710. As discussed above, a new request is simply added to the bottom of the queue. To accomplish this, the contents of next request pointer 723 in what, i.e. request 725, was previously the last request in queue 710 are changed from the null value to the relative address of the beginning location of new proof request 735. Next request pointer 733 which is situated within request 735 is then set to the null value. In addition, the contents of last entry pointer 620 are changed to point the relative address of the beginning of new request 735 rather than to request 725, in order to signify that no further requests exist within queue 710.

The pseudo-code for a routine, specifically the AddtoQueue routine, that can be used to add new proof requests to the bottom of a queue is given in Table 6 below. Based upon the pseudo-code for this routine, as well as for all the other routines specifically discussed hereinbelow, the particular manner through which all of these routines will be implemented will, of course, depend upon the specific processor used in the RIP, but nevertheless will be readily apparent to anyone skilled in the art from the pseudo-code description thereof.

TABLE 6

Add_to_Queue routine

Add_to_Queue: Procedure(Queue)
　　New_element := Allocate_memory(size of Proof request)
　　Fill_in_PRQE_data_elements(New_element)
　　New_element -> Next Entry := NULL
　　IF (First_Entry == NULL)　　/*the queue is empty
　　　　First_Entry := New_element
　　　　Last_Entry := New_element
　　else　　　　　　　　　　　/*the queue is not empty
　　　　Last_Entry -> Next_Entry := New_element
　　　　Last_Entry -= New_element
End Add_to_Queue As indicated by the pseudo-code in Table 6, adequate memory space is first allocated to accommodate a new proof request and is collectively assigned the variable name "New_element". Thereafter, the respective components for this new request (proof request queue element—PRQE) are successively filled in from the incoming proof request received from a CEPS (or other device). Once this occurs, the next request pointer (Next_entry) in this new element is set to a null value. Thereafter, based upon whether the queue was previously empty or not, the contents of the first and last entry pointers are both set to point to the starting address of the new request, or the nextentry pointer in what was previously the last request in the queue and the last entry pointer are both set to point to the starting address of the new request, respectively. For definitional purposes, the operator ":=" represents assignment, "->" represents an element (specified to the right of the operator) in a data structure (specified to the left of the operator), and "==" represents exactly equal.

Figure 8A:
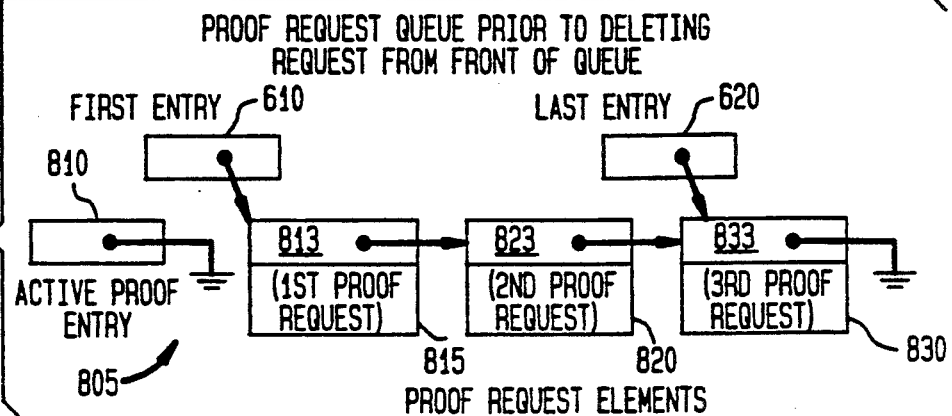
FIG. 8A depicts simplified proof request queue 805 from which existing proof request 815 will be deleted therefrom.
Figure 8B:
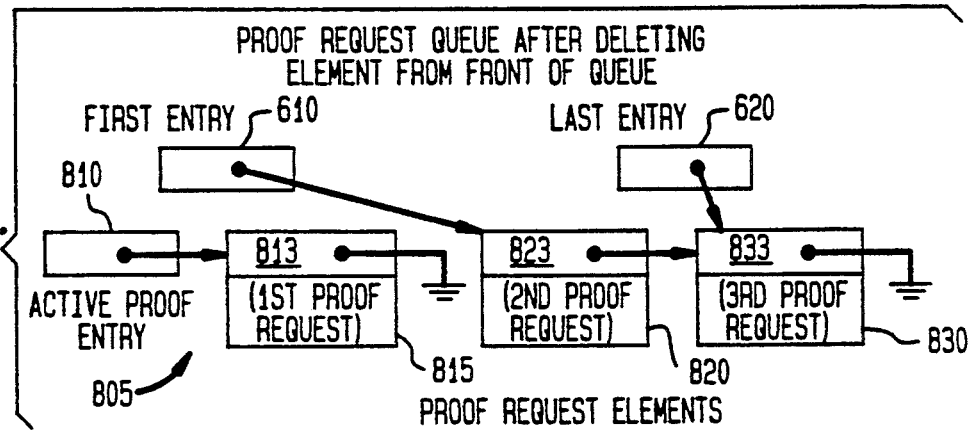
FIG. 8B depicts simplified proof request queue 805 after existing proof request 815 has been deleted therefrom.

The manner in which a proof request (entry) is deleted from illustratively the top of the queue is shown in FIGS. 8A and 8B. Specifically, FIG. 8A depicts queue 805 from which existing request 815 will be deleted. As shown, proof requests 815, 820 and 830 are all waiting to be processed. First entry pointer 620, 610 points to the starting location of request 815; last entry pointer points to the starting location of third proof request 830. Through internal next request pointers 813, 823 and 833, proof requests 815, 820 and 830 form a linked list. Active proof entry pointer 810, which defines the proof requests that have been processed, currently contains a null value.

To delete first proof request 815 from queue 805, active proof entry pointer 810 is changed to point to the starting location of request 815. In addition, the contents of first entry pointer 610 are changed to point to the starting location of second proof request 820. Also, the contents of next request pointer 813 situated within request 815 are changed to the null value. As a result, request 815 is deleted from the queue of pending requests. The resulting queue contains only requests 820 and 830 to be processed.

The pseudo-code for a routine, specifically the DeletefromQueue routine, that can be used to delete a proof request from the top of a queue and return this request is given in Table 7 below. Both this routine and the AddtoQueue routine shown in Table 6 above would form part of Queue Handling Routines 310 shown in FIGS. 3–5 and discussed above.

TABLE 7

Delete from Queue routine

Delete_from_Queue: Procedure(Queue)
　　If (First_Entry == NULL)　　/*the queue is empty
　　　　Active_proof_entry := NULL
　　else　　　　　　　　　　　/*the queue is not empty
　　　　Active_proof_entry := First_entry
　　　　First_Entry := First_Entry -> Next_Entry
　　　　Active_proof_entry -> Next_Entry := NULL
　　return(Active_proof_entry)
End Delete_from_Queue As indicated by the pseudo-code in Table 7, if the queue is empty (i.e. the first entry pointer contains the null value), then no changes are made to the queue with the contents of the active proof entry pointer being set to the null value. If, however, a first request exists in the queue, the contents of the active proof entry pointer are set to point to the starting address of this request. The contents of the first entry pointer are then set to the starting address which resides in the next request (Nextentry) pointer in what was the first request in the queue. The contents of the next request (Nextentry) pointer in what was the first request is then set to the null value. Once these steps occur, the first request has been effectively removed from the queue and returned. Clearly, this routine can be easily modified in a manner readily apparent to those skilled in the art to permit the DDCP operator to delete any pending request, not just the first, from the queue and then return the deleted request. To accomplish this, the next request pointer within the queue element immediately prior to the request being deleted would be modified to point to the next successive request, if any, in the queue after the one being deleted or to the null value, if no such next request currently existed. The proof request being deleted would then be appended, again through changes to appropriate pointers, to the last active proof request. In addition, the first and/or last entry pointers would also be changed, if necessary, based upon the position in the queue of the request being deleted.

Figure 9:
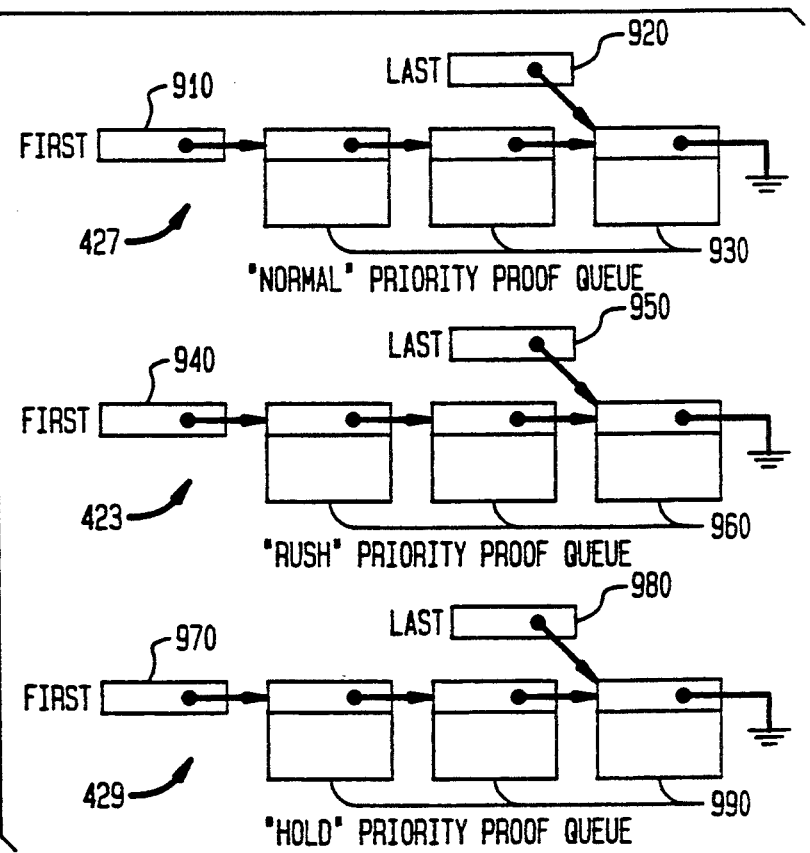
FIG. 9 depicts the individual queues that collectively form proof request queue 420 shown in FIGS. 3-5.

FIG. 9 depicts three identical linked list based queues that collectively form proof request queue 420 shown in FIGS. 3–5. As shown, proof request 420 is formed of "normal" priority proof request queue 427, "rush" priority request queue 423 and "hold" priority request queue 429. Each of these queues is shown as illustratively containing three proof requests, requests 930 for queue 427, requests 960 for queue 423 and requests 990 for queue 429. In addition, each of these queues has associated first and last entry pointers: pointers 910 and 920 for queue 930, pointers 940 and 950 for queue 960, and pointers 970 and 980 for queue 990.

The following pseudo-code routine, specifically the Queue Management Routine, specifies the priority, as described above, through which requests in these queues are processed. This routine would be executed within queue handling routine 310 shown in FIGS. 3–5.

TABLE 8

Queue Management routine

Queue Management Routine
    Proof Requests are processed from the "Rush" Queue first
    If(the "Rush" queue is empty) then
        Processing continues from the "Normal" queue
End Queue Management

E. Proof Request Construction and Handling

Proof requests themselves are simply established using a menu based approach through which a CEPS (or other device) operator calls up a proof request screen display and sequentially enters parameter values, field-by-field, into the request. Once values or file name(s) have been entered for all the fields, the CEPS copies the request to a memory block, transfers it to the RIP which, in turn enters the request into the appropriate priority queue.

The following pseudo-code routine, specifically the Construct A Proof Request routine, shown in Table 9 below, specifies the overall manner through which a proof request is constructed at a CEPS or at the operator PC.

TABLE 9

Construct_A_Proof_Request Routine

Construct_A_Proof_Request: Procedure
    Prompt the operator with a blank "form" indicating required data elements for a proof request
    Do
        Facilitate the entry of the "form",
            field-by-field, such as by prompting the user for each successive field
    until (the "Proof" soft key is depressed)
    Allocate a block of memory from a free memory pool;
    Copy the proof request information from the "form" into the memory block;
    Transmit the proof request to the RIP which will add that request into a specific priority queue indicated within the proof request
End Construct_A_Proof_Request Through this routine, the operator is presented with a screen display, such as proof request set-up screen 1000 shown in FIG. 10, but without any user parameter values. In essence, the user sees a blank "form" for a proof request. Once this screen is displayed, the user is queried, typically by prompting, to enter each required parameter value and file name required to form a complete proof request. Thereafter, by depressing the "Proof" key, as discussed below, the operator will signify that data entry has been concluded and that this request is to be sent to the RIP for subsequent processing and printing. To accomplish these operations, the CEPS allocates a memory block for this request, writes the request into this block and then transmits the request to the RIP. Thereafter, the RIP appropriately queues the request for subsequent processing.

FIG. 10 depicts proof request set-up screen display 1000, that is generated at any CEPS station or at operator PC 120 situated within DDCP system 10 shown in FIG. 1, for use by an operator in interactively generating a proof request in the manner specified in the Construct_A_Proof_Request routine shown in Table 9 and discussed above. Through software executing at a CEPS station (or operator PC), a blank version of screen 1000 would be displayed at this station (or PC), but with field headings, and the operator would then successively move through the screen and fill in desired values for the fields or accept default values therefor, where appropriate. This screen can be called up at any time, through appropriate menus, to enable an operator to formulate and launch a proof request.

Specifically and as shown in FIG. 10, based upon the pathname chosen by the operator for the accompanying contone files, the CEPS would supply its device name (here shown as D0) and the job name (here shown as Job 1) would be filled in by the CEPS. The operator would supply the page name (here Page 1) for this request as well as the file name for the overall image to be proofed—these file names generally being differentiated based upon the type of image to be proofed, e.g. contone (here CT1), linework (LW#, where # is an arbitrary number), a file (Dx#) that has already been processed by the RIP but not proofed, or other types. Through the "Format" field, the operator can change the format of a proof request, though would not ordinarily need to do so. Based upon the format of the proof request, various default values are initially defined and displayed for various parameter values and can be selected by the operator. The operator would also specify the type of layout desired, either a single image, or a here as scatter proof by appropriately toggling the entry in the "Layout" field. Through the "Expose Offset" fields, the operator can indicate the upper left hand corner of the image, in terms of the height and width, to be proofed relative to the upper left hand corner of the proof image area on the media. These dimensions are used for scatter proofing only. The operator then selects a desired priority as well as entering the desired number of proof copies of the image. The operator would set the Mirror Width field, if necessary, based upon the characteristics of this CEPS. Thereafter, the operator would supply the order of the separations as well as the media color and special donor "recipe" colors to use and their accompanying contone data files. In conjunction with this display, various "soft" function keys are implemented within the CEPS (or other device) with the legends being painted at the bottom of the screen. These keys enable the operator through the "Quit" key to terminate proof set-up, through the "Proof" key to send the current proof request to the DDCP for processing and proofing; and through the "Prev" and "Next" keys to scroll through and edit, for a present scatter proof request, any previous or subsequent proof set-up screen for an individual image that is to form part of this request relative to the request for the image currently being displayed.

FIG. 11 depicts proof request queue screen display 1100, that is generated at operator PC 120 shown in FIG. 1, for listing the current contents of the proof request queue 420 shown in FIGS. 3–5. This screen can be called up at any time by the operator. Software for generating this screen executes within the operator PC and queries and obtains data from RIP 100 (shown in FIG. 1) to complete the display.

As shown in FIG. 11, screen display 1100 provides the status of the proofing engine, here shown as "On-Line". This display also indicates what specific job is being processed by the RIP and what specific job is being printed by the proofing engine, in terms of its station name (here its CEPS name, such as "Assembler 2" and "Prisma4", respectively) and its basic file name (identifier—here shown as "CTA12009" and "GGL010"). The quantity of each proof image that is to be produced (here shown as 1) for each of these two active jobs is provided, along with its image type (e.g. contone—CT, and/or linework—LW, or scatter) and its current status ("In expose"—i.e. being printed by the proofing engine, or "In Preparation"—i.e. being processed through the RIP). The proof requests that are pending in the queue, but have not been processed or printed, are also displayed (here eleven such requests exist) with the associated priority values (here being illustrative values 1, 2, 3 or 4). Those requests situated in the "rush" priority queue are listed first, followed by those in the "normal" priority queue and finally by those in the "hold" priority queue. Various soft function keys, specifically "Exit", "Change Priority", "Delete Entry", "Edit Entry", "Scatter Proof" and "Prev" and "Next", are provided in conjunction with this screen display. Through the "Exit" key, the operator can instruct the operator PC to exit from this screen. Through the "Change Priority" or "Delete Entry" keys, the operator can respectively change the priority of any given proof request or delete that request from the queue. Depressing the "Edit Entry" key will instruct the operator PC to display the proof request setup screen (i.e. screen 1000 shown in FIG. 10 and discussed in detail above) for the selected request in order to enable the operator to examine and/or change parameter value(s) associated with that request. The cursor in the form of an asterisk (*) indicates which proof request, if any (here request 9), the operator has selected to currently edit, delete or change priority. If the operator depresses the "Scatter Proof" key, the operator PC, through the RIP, will display a scatter proof set-up screen, such as screen 1200 shown in FIG. 12 and discussed in detail below, to enable the DDCP operator to form a scatter proof using proof requests pending in the "hold" priority queue that have been enabled for scatter proofing. Lastly, through the "Prev" and "Next" soft keys in screen display 1100 shown in FIG. 11, the DDCP operator can scroll between and display previous and next successive screens of queued proof requests, where the number of queued requests exceeds those which can be displayed on a single display screen.

F. Scatter Proof Request Construction and Management

FIG. 12 depicts scatter proof set-up screen display 1200 that is generated at operator PC 120 shown in FIG. 1. Through this particular screen display, the DDCP operator can formulate a scatter proof request from proof requests that have a hold priority and for which scatter proofing has been enabled. As shown in FIG. 12, screen display 1200 lists those specific proof requests, here numbered 1–8, that have been incorporated into a particular scatter proof image as well as the name of the scatter proof image itself (here "SCAT1"), the overall size of the image area (here illustratively 314 mm in width by 489 mm in height), the priority of the scatter proof request (here Normal) and the number of image copies that is to be printed for this scatter proof request (here 1). Each of the individual proof requests that will be combined into the actual scatter proof image are specifically identified by its basic file name, e.g. "MON005" for request 1. The operator PC obtains the image size for each of these requests from RIP 100 and lists this size information as part of each of these requests. In establishing a scatter proof request, the DDCP operator enters the upper left hand coordinates (in terms of height, y, and width, x, relative to the upper left hand corner of the scatter proof image area) of each individual image to be printed. Based upon the size of that image, the operator PC calculates and displays the position of the bottom (lower) right hand corner of this image, again in terms of height, y, and width, x, relative to the upper left hand corner of the scatter proof image area. A scatter proof request can accommodate up to illustratively eight separate images, each from a different corresponding proof request. The lower portion of screen display 1200 lists the remaining proof requests (here numbered 1–5), that have a "hold" priority and have been enabled for scatter proofing, but which have not yet been incorporated into a scatter proof request. The DDCP operator can subsequently choose any of these particular requests to construct the next scatter proof or, if additional requests can be accommodated and adequate space exists in the image area for the current scatter proof request, add any of these requests to the current scatter proof request.

Various soft function keys, specifically "Exit List", "Select", "Unselect", "Quit", and "Prey" and "Next", are provided in conjunction with screen display 1200. Through the "Exit List" key, the operator can instruct the operator PC to save all changes made to the scatter proof request currently being displayed and enter the scatter proof request into the appropriate queue for subsequent processing and printing. The "Select" and "Unselect" keys permit the DDCP operator to respectively either add a proof request to the current scatter proof request or delete such a request therefrom. When depressed, the "Quit" soft key instructs the Operator PC to exit from a procedure that displays screen 1200 but without saving any changes. Lastly, through the "Prev" and "Next" soft keys, the DDCP operator can scroll between and display previous and next successive screens for a single scatter proof request, where the number of proof requests that forms this scatter proof request as well as those awaiting incorporation into a scatter proof request exceeds those which can be displayed on a single scatter proof request screen display, such as screen display 1200. Since the specific software used to generate display screens 1000, 1100 and 1200 and appropriately interact with an operator will be readily apparent to those skilled in the art, this software will not be discussed in any detail herein.

The following pseudo-code routines for Scatter Proof Management and Scatter Proof Assembly provided in respectively Tables 10 and 11 below, specify the overall manner through which individual proof requests that are to be subsequently used to form a scatter proof request are managed and the manner through which a scatter proof request is constructed and entered into an appropriate queue. The Scatter Proof Management Routine would be executed within the RIP and specifically within Queue Handling Routine 310 shown in FIGS. 3–5, while the Scatter Proof Assembly Routine would be executed within the Operator PC.

TABLE 10

Scatter Proof Management routine

```
Scatter Proof Management
    If(a Proof Request is made with a "Hold" priority
        and is enabled for scatter proofing)
    Then
        Add the proof request to the "Hold" queue
End Scatter Proof Management
```

Through the Scatter Proof Management Routine, all incoming individual proof requests that have a "hold" priority and which have been enabled, as discussed below by a CEPS operator, for inclusion in a scatter proof, are simply queued by the RIP within the "Hold" priority queue.

TABLE 11

Scatter Proof Assembly routine

```
Scatter Proof Assembly
    For all Proof Requests in the "Hold" queue and
        which have been enabled for scatter proofing
        Interface with the user to select the
            appropriate requests and complete the
            starting location fields therefor to build a
            scatter proof request
        Disable these individual proof requests for
            scatter proofing;
        Through the RIP, enter the resulting scatter
            proof request into the "normal" or "rush"
            queues based upon operator selection
End Scatter Proof Assembly
```

Through the Scatter Proof Assembly Routine, the DDCP operator selects the particular proof requests that are to form a scatter proof and interactively inserts the starting locations for these requests. Thereafter, to prevent these proof requests from being incorporated into a subsequent scatter proof request, each of these proof requests is disabled for scatter proofing and deleted from the pending list of proof requests displayed at the bottom of screen display 1200. Once this occurs, the new scatter proof request is entered into the rush or normal priority queue as selected by the DDCP operator.

Clearly, by now, those skilled in the art will readily recognize that although the invention has been described in terms of a color proofing system that generates a proof image from data representing four subtractive primary color (C, Y, M and B) contone separations, our invention can readily be used in a proofing system that processes other image data, such as illustratively gray scale halftone or other color coordinate based data. With such gray scale data, the color information would be replaced with a single range of gray scale values from, for example, for eight-bit resolution, "0" to "255".

Furthermore, although our invention has been described in terms of processing incoming interleaved contone image data in conjunction with each proof request, to reduce the amount of data associated with each request as well as to reduce the amount of processing required by the RIP to handle each request, this data could alternatively and illustratively be screened halftone image data. In this case, to handle a particular proof request, the RIP would not need to screen any data but would, in essence, queue the request as noted above, and, upon the availability of a hard file, then transfer the associated halftone image data from the device of which it resides into the hard file pending the subsequent availability of the proofing engine to print the data. Clearly, a wide variety of other different types of incoming image data could be used in conjunction with each request based upon the particular system in which our invention is to be used and the specific processing and/or data transfer operations that are to occur therein for handling each such request.

In fact, as one can now appreciate, our present invention itself is independent of the specific data used in processing each request and thus will find broad application in many queue based transaction processing systems in which each transaction will process a large amount of accompanying data.

Therefore, although one embodiment of the present invention has been shown and described in detail herein, clearly many other varied embodiments that incorporate the teachings of our invention may be easily constructed by those skilled in the art.

INDUSTRIAL APPLICABILITY AND ADVANTAGES

The present invention is useful in a wide variety of queue based transaction processing systems in which each transaction will process a relatively large amount of accompanying data and is particularly useful in a direct digital color proofing (DDCP) system that generates a proof image from continuous tone separation data. Advantageously, use of the invention in a DDCP system both substantially increases the throughput of proof images provided by such a system and simultaneously reduces needed operator interaction with the system than would otherwise occur to correctly generate a sequence of proof images.

What is claimed is:

1. A digital color proofing system comprising:

a plurality of proof requesting devices; and proof request processing means, connected to said proof requesting devices, for receiving a plurality of incoming proof requests from said proof requesting devices at a rate which may be greater than a maximum rate at which said proof request processing means can process proof requests, at least some of said proof requests being received for later processing, wherein each one of said proof requests specifies a desired proofing operation, contains a file name identifying a file stored only at a proof requesting device until said proof request processing means is ready to process said one proof request, said identified file containing image data to be proofed, and contains a device name identifying said proof requesting device at which said identified file is stored, wherein said proof request processing means comprises:

means, responsive to the file name and the device name contained in said one proof request, for sending, whenever said one proof request is ready to be processed, an instruction to the device specified by said device name contained in said one proof request to supply to said proof request processing means the file specified by said file name contained in said one proof request;

a first-in, first-out queue for storing said proof requests pending processing thereof; and a digital processor for processing the image data contained in said specified file supplied by said specified device so as to perform the proofing operation specified by said one proof request;
wherein said digital processor comprises:
  means for manipulating said queue and processing each proof request stored therein comprising:
    means for successively storing incoming proof requests in said queue at successive available locations;
    means for reading a proof request situated at a top of said queue; and
    means, responsive to said proof request read from said queue and operative only in the event that sufficient system resources are then available to process said proof request so read, for processing said read proof request;
  whereby through inclusion of a file name and a device name in each one of said proof requests in place of needed image data, proof requests may be stored at said proof request processing means for later processing in less memory space than would be required otherwise.

2. The system in claim 1 wherein said queue manipulating and stored proof request processing means further comprises:
  means for deleting the read proof request from said queue once said read request has been fully processed; and
  means, in the event that sufficient system resources are not then available to process the read request, for reading a next successive proof request in said queue.

3. The system in claim 2 wherein said queue comprises a linked list.

4. The system in claim 2 wherein said digital processor comprises:
  a plurality of queues, wherein each of said queues stores proof requests having a different corresponding priority; and
  said reading means comprises means for reading all the proof requests stored in a highest priority one of said queues first and followed by all the proof requests stored in each one of the successively lower priority queues.

5. The system in claim 2 wherein said one proof request further comprises pre-defined information which defines a manner through which the image data specified in said one request is to be processed; and wherein said digital processor, in response to said information, processes said image data in the manner defined by said information to provide said operation.

6. The system in claim 5 further comprising means for generating said plurality of proof requests and for sending each of said plurality of proof requests in seriatim to said proof request processing means.

7. The system in claim 6 wherein said generating means comprises at least one color electronic pre-press system.

8. The system in claim 5 wherein said image data is either halftone or continuous tone separation image data and said system further comprises a proofing engine, connected to said digital processor, for printing a proof image from the image data specified in each of said proof requests.

9. The system in claim 8 wherein said proofing engine comprises means, responsive to said corresponding halftone separation data, for printing the proof image by successively writing each one of a plurality of screened halftone tone separations so as to yield a correspondingly single colored halftone image in an overlaid fashion with proper registration with respect to all other single colored halftone images that are to form said proof image.

10. The system in claim 9 wherein the proofing engine is a sublimation dye transfer marking engine.

11. The system in claim 8 wherein said read request processing means comprises:
  means, responsive to the file of data supplied from the device in connection with said one request, for generating corresponding halftone separation data therefor; and
  means for storing said corresponding halftone separation data into a memory pending printing of said halftone separation data to yield said proof image.

12. The system in claim 11 wherein said memory comprises first and second memory sections, wherein one of said sections is operated to read stored data therefrom while the other section is operated to write data therein; wherein the halftone separation data storing means further comprises:
  means for storing said halftone separation data into the first memory section; and said digital processor further comprises:
    means, operative in a substantially simultaneous basis as halftone separation data is being written into said first memory section, for reading stored halftone separation data from said second section and applying said separation data so read therefrom to said proofing engine in order to generate a proof image therefor and for repetitively reversing the functioning of said first and second memory sections at the conclusion of immediately prior read and write operations involving said first and second sections: whereby through simultaneous reading and writing operations involving said first and second memory sections pipelined operation occurs to provide increased system throughput of printed proof images.

13. The system in claim 12 wherein said read request processing means and said reading and reversing means collectively comprise a series of software based re-entrant processes co-existing under a common operating system wherein each of said processes is blocked or unblocked for current execution based upon whether sufficient system resources are then available to execute said each process.

14. The system in claim 11 wherein said halftone separation data generating means comprises:
  means for de-interleaving the file of data, supplied from the device in connection with said one request, into continuous tone separation files; and
  means for screening each of said continuous tone separation files, in accordance with the information contained in said one request, to yield corresponding halftone separation data for a plurality of corresponding halftone separations for the proof image.

15. The system of claim 14 wherein said read request processing means further comprises: means for translating the data in the file supplied from the device from one form to another prior to supplying said data in the file to said de-interleaving means.

16. A digital color proofing system comprising:
  a plurality of proof requesting devices; and
  a raster image processor, connected to an input line, for receiving a plurality of incoming proof requests on said line from said proof requesting devices, at least some of said proof requests being received for later processing, wherein each one of said requests initiates a corresponding image processing operation, each one of said proof requests having a file name, for identifying a file containing image data to be processed, said file being stored only at one of said proof requesting devices until said corresponding image processing operation is initiated, and a device name for identifying said one proof requesting device at which the file resides, wherein said raster image processor comprises:

means, responsive to the file name and the device name contained in said one proof request, for generating, whenever said one request is ready to be processed, an instruction over the line to instruct the device to supply over the line the file of image data specified by said file name; a first-in, first-out queue for storing said proof requests pending processing thereof; and a digital processor for processing the image data contained in the file supplied by said device so as to perform the corresponding image processing operation associated with said one request; wherein said digital processor comprises:

means for manipulating the queue and processing each proof request stored therein comprising:

means for successively storing incoming proof requests appearing on said line in the queue at successive available locations;

means for reading a proof request situated at a top of the queue; and means, responsive to the proof request read from the queue and operative only in the event that sufficient system resources are then available to process the proof request so read, for processing the read proof request; whereby through inclusion of a file name and a device name in each one of said requests rather than corresponding image data associated therewith each one of said requests consumes less memory space than that required by the corresponding image data.

17. The system in claim 16 wherein said queue manipulating and stored proof request processing means further comprises:

means for deleting the read request from said queue once said read request has been fully processed; and means, in the event that sufficient system resources are not then available to process the read request, for reading a next successive proof request in said queue.

18. The system in claim 17 wherein said queue comprises a linked list.

19. The system in claim 17 wherein said digital processor comprises:

a plurality of queues, wherein each of the queues stores proof requests having a different corresponding priority; and said reading means comprises means for reading all the proof requests stored in a highest priority one of said queues first and followed by all the proof requests stored in each one of the successively lower priority queues.

20. The system in claim 17 wherein said one proof request further comprises pre-defined information which defines a manner through which the image data associated with said one proof request is to be processed; and wherein said digital processor, in response to said information, processes the data in the manner defined by the information to provide said operation.

21. The system in claim 20 wherein said image data is either halftone or continuous tone separation image data and said system further comprises a proofing engine, connected to said digital processor, for printing a proof image from the data associated with each of said proof requests.

22. The system in claim 21 further comprising at least one color electronic pre-press system for generating said plurality of proof requests and for applying said requests to said input line.

23. The system in claim 21 wherein said proofing engine comprises means, responsive to said corresponding halftone separation data, for printing the proof image by successively writing each one of a plurality of screened halftone tone separations so as to yield a correspondingly single colored halftone image in an overlaid fashion with proper registration with respect to all other single colored halftone images that are to form said proof image.

24. The system in claim 23 wherein the proofing engine is a sublimation dye transfer marking engine.

25. The system in claim 21 wherein said read request processing means comprises:

means, responsive to the file of data supplied from the device in connection with said one request, for generating corresponding halftone separation data therefor; and means for storing said corresponding halftone separation data into a memory pending printing of said halftone separation data to yield said proof image.

26. The system in claim 25 wherein said memory comprises first and second memory sections, wherein one of said sections is operated to read stored data therefrom while the other section is operated to write data therein; wherein the halftone separation data storing means further comprises:

means for storing said halftone separation data into the first memory section; and said digital processor further comprises:

means, operative in a substantially simultaneous basis as halftone separation data is being written into said first memory section, for reading stored halftone separation data from said second section and applying said separation data so read therefrom to said proofing engine in order to generate a proof image therefor and for repetitively reversing the functioning of said first and second memory sections at the conclusion of immediately prior read and write operations involving said first and second sections: whereby through simultaneous reading and writing operations involving said first and second memory sections pipelined operation occurs to provide increased system throughput of printed proof images.

27. The system in claim 26 wherein said read request processing means and said reading and reversing means collectively comprise a series of software based re-entrant processes co-existing under a common operating system wherein each of said processes is blocked or unblocked for current execution based upon whether sufficient system resources are then available to execute said each process.

28. The system in claim 25 wherein said halftone separation data generating means comprises:

means for de-interleaving the file of data, supplied from the device in connection with said one request, into continuous tone separation files; and means for screening each of said continuous tone separation files, in accordance with the information contained in said one request, to yield corresponding halftone separation data for a plurality of corresponding halftone separations for the proof image.

29. The system of claim 28 wherein said read request processing means further comprises: means for translating the data in the file supplied from the device from one form to another prior to supplying said data in the file to said de-interleaving means.

30. A method for use in a digital color proofing system comprising the steps of:

processing a plurality of incoming proof requests received on an input line from a plurality of proof requesting devices, at least some of said proof requests being received for later processing, wherein each one of said requests initiates a corresponding processing operation, each one of said requests having a file name, for identifying a file containing data to be processed, said file being stored only on one of said proof requesting devices until said corresponding processing operation is initiated, and a device name for identifying said one proof requesting device on which the file resides, wherein said proof requests processing step comprises the steps of:

generating, in response to the file name and the device name contained in said one request and whenever said one request is ready to be processed, an instruction over the line to instruct the device to supply over the line the file of data specified by said file name; and digitally processing the data contained in the file supplied by said device so as to perform the corresponding processing operation associated with said one request; and further comprises the step of:

manipulating a queue and processing each request stored therein comprising the steps of:

successively storing incoming requests appearing on said line in the queue at successive available locations;

reading a request situated at a top of the queue; and in response to the request read from the queue and operative only in the event that sufficient system resources are then available to process the request so read, processing the read request; whereby through inclusion of a file name and a device name in each one of said proof requests rather than corresponding data associated therewith each one of said proof requests consumes less memory space than that required by the corresponding data.

31. The method in claim 30 wherein said queue manipulating and stored proof request processing step further comprises the steps of:

deleting the read request from said queue once said read request has been fully processed; and in the event that sufficient system resources are not then available to process the read request, reading a next successive request in said queue.

32. The method in claim 31 wherein said one proof request further comprises pre-defined information which defines a manner through which the image data associated with said one request is to be processed; and wherein said digitally processing step, in response to said information, processes the image data in the manner defined by the information to provide said operation.

33. The method in claim 32 further comprising the steps of:

generating said plurality of proof requests; and applying each of said plurality of requests in seriatim to said input line.

34. The method in claim 32 wherein said data is either halftone or continuous tone separation image data and said method further comprises the step of printing a proof image, through a proofing engine, from the data associated with each of said requests.

35. The method in claim 34 wherein said printing step comprises the step of printing, in response to said corresponding halftone separation data, the proof image by successively writing each one of a plurality of screened halftone tone separations so as to yield a correspondingly single colored halftone image in an overlaid fashion with proper registration with respect to all other single colored halftone images that are to form said proof image.

36. The method in claim 35 wherein said read request processing step comprises the steps of:

generating, in response to the file of data supplied from the device in connection with said one request, corresponding halftone separation data therefor; and storing said corresponding halftone separation data into a memory pending printing of said halftone separation data to yield said proof image.

37. The method in claim 36 wherein said memory comprises first and second memory sections, wherein one of said sections is operated to read stored data therefrom while the other section is operated to write data therein; wherein the halftone separation data storing step further comprises the steps of:

storing said halftone separation data into the first memory section; and said digitally processing step further comprises the steps of:

reading stored halftone separation data from said second section and applying said separation data so read therefrom to said proofing engine in order to generate a proof image therefor on a substantially simultaneous basis as halftone separation data is being written into said first memory section; and repetitively reversing the functioning of said first and second memory sections at the conclusion of immediately prior read and write operations involving said first and second sections; whereby through simultaneous reading and writing operations involving said first and second memory sections pipelined operation occurs to provide increased system throughput of printed proof images.

38. The method in claim 36 wherein said halftone separation data generating step comprises the steps of:

de-interleaving the file of data, supplied from the device in connection with said one request, into continuous tone separation files; and screening each of said continuous tone separation files, in accordance with the information contained in said one request, to yield corresponding halftone separation data for a plurality of corresponding halftone separations for the proof image.

39. The method of claim 38 wherein said read request processing step further comprises the step of translating the data in the file supplied from the device from one form to another prior to supplying said data in the file to said de-interleaving step.

40. In a digital color proofing system having a raster image processor connected to an input line, a method comprising the steps of:

processing a plurality of incoming proof requests received on said line from a plurality of proof requesting devices, at least some of said proof requests being received for later processing, wherein each one of said requests initiates a corresponding image processing operation, each one of said proof requests having a file name, for identifying a file containing image data to be processed, said file being stored only on one of said proof requesting devices until said corresponding image processing operation is initiated, and a device name for identifying said one proof requesting device on which the file resides, wherein said proof request processing step comprises the steps of:

generating, in responsive to the file name and the device name contained in said one proof request, whenever said one request is ready to be processed, an instruction over the line to instruct the device to supply over the line the file of image data specified by said file name; and digitally processing the image data contained in the file supplied by said device so as to perform the corresponding image processing operation associated with said one request; further comprises the step of:

manipulating a queue and processing each proof request stored therein comprising the steps of:

successively storing incoming proof requests appearing on said line in the queue at successive available locations;

reading a proof request situated at a top of the queue; and reading a proof request situated at a top of the queue; and in response to the proof request read from the queue and operative only in the event that sufficient system resources are then available to process the proof request so read, processing the read proof request; whereby through inclusion of a file name and a device name in each one of said proof requests rather than corresponding image data associated therewith each one of said proof requests consumes less memory space than that required by the corresponding image data.

41. The method in claim 40 wherein said queue manipulating and stored proof request processing step further comprises the steps of:

deleting the read request from said queue once said read request has been fully processed; and in the event that sufficient system resources are not then available to process the read request, reading a next successive proof request in said queue.

42. The method in claim 41 wherein said one proof request further comprises pre-defined information which defines a manner through which the image data associated with said one proof request is to be processed; and wherein said digitally processing step, in response to said information, processes the data in the manner defined by the information to provide said operation.

43. The method in claim 42 wherein said image data is either halftone or continuous tone separation image data and said method further comprises printing a proof image, through a proofing engine, from the data associated with each of said proof requests.

44. The method in claim 43 further comprising the steps of:

generating said plurality of proof requests; and applying said requests to said input line.

45. The method in claim 43 wherein said printing step comprises the step of printing, in response to said corresponding halftone separation data, the proof image by successively writing each one of a plurality of screened halftone tone separations so as to yield a correspondingly single colored halftone image in an overlaid fashion with proper registration with respect to all other single colored halftone images that are to form said proof image.

46. The method in claim 43 wherein said read request processing step comprises the steps of:

generating, in response to the file of data supplied from the device in connection with said one request, corresponding halftone separation data therefor; and storing said corresponding halftone separation data into a memory pending printing of said halftone separation data to yield said proof image.

47. The method in claim 46 wherein said memory comprises first and second memory sections, wherein one of said sections is operated to read stored data therefrom while the other section is operated to write data therein; wherein the halftone separation data storing step further comprises the step of:

storing said halftone separation data into the first memory section; and said digitally processing step further comprises the steps of:

reading stored halftone separation data from said second section and applying said separation data so read therefrom to said proofing engine in order to generate a proof image therefor on a substantially simultaneous basis as halftone separation data is being written into said first memory section; and repetitively reversing the functioning of said first and second memory sections at the conclusion of immediately prior read and write operations involving said first and second sections; whereby through simultaneous reading and writing operations involving said first and second memory sections pipelined operation occurs to provide increased system throughput of printed proof images.

48. The method in claim 46 wherein said halftone separation data generating step comprises the steps of:

de-interleaving the file of data, supplied from the device in connection with said one request, into continuous tone separation files; and screening each of said continuous tone separation files, in accordance with the information contained in said one request, to yield corresponding halftone separation data for a plurality of corresponding halftone separations for the proof image.

49. The method of claim 48 wherein said read request processing step further comprises the step of: translating the data in the file supplied from the device from one form to another prior to supplying said data in the file to said de-interleaving step.

* * * * *